United States Patent
Suzuki

(10) Patent No.: US 7,897,226 B2
(45) Date of Patent: Mar. 1, 2011

(54) ADHESIVE SHEET AND A RELEASE LINER

(75) Inventor: Yasuhiro Suzuki, Fukaya (JP)

(73) Assignee: Riken Technos Corporation, Tokyo (JP)

( * ) Notice: Subject to any disclaimer, the term of this patent is extended or adjusted under 35 U.S.C. 154(b) by 754 days.

(21) Appl. No.: 11/578,329

(22) PCT Filed: Apr. 14, 2005

(86) PCT No.: PCT/JP2005/007238
§ 371 (c)(1),
(2), (4) Date: Nov. 7, 2006

(87) PCT Pub. No.: WO2005/100499
PCT Pub. Date: Oct. 27, 2005

(65) Prior Publication Data
US 2007/0292650 A1 Dec. 20, 2007

(30) Foreign Application Priority Data

Apr. 16, 2004 (WO) .................. PCT/JP2004/005468

(51) Int. Cl.
B32B 9/00 (2006.01)
B32B 33/00 (2006.01)
B32B 7/12 (2006.01)
(52) U.S. Cl. .................. 428/40.1; 428/42.1; 428/343
(58) Field of Classification Search .................. 428/40.1, 428/42.1, 343
See application file for complete search history.

(56) References Cited

U.S. PATENT DOCUMENTS 5,897,930 A * 4/1999 Calhoun et al. .............. 428/41.8
2003/0077442 A1 4/2003 Inokuchi et al.

FOREIGN PATENT DOCUMENTS

| JP | Y2 2503717 | 4/1996 |
| JP | A 9-504325 | 4/1997 |
| JP | A 10-114036 | 5/1998 |
| JP | Y2 2587198 | 10/1998 |
| JP | A 11-209704 | 8/1999 |
| JP | A 2002-544364 | 12/2002 |
| JP | A 2003-127299 | 5/2003 |
| JP | A 2003-277701 | 10/2003 |
| KR | 00253460 B1 | 1/2000 |
| WO | WO 95-11945 | 5/1995 |
| WO | WO 99/35201 | 7/1999 |

* cited by examiner

Primary Examiner — Patricia L. Nordmeyer
(74) Attorney, Agent, or Firm — Oliff & Berridge, PLC

(57) ABSTRACT

The present invention provides an adhesive sheet comprising a resin film and an adhesive layer adhering to one side of said resin film, wherein the adhesive sheet does not cause significant shrinkage when it is stored together with a release liner thereon for a prolonged time. The adhesive sheet of the present invention is an adhesive sheet comprising a resin film and an adhesive layer adhering to one side of said resin film, characterized in that said adhesive layer has one or more grooves on a side opposite to a side on which said adhesive layer adheres to said resin film, and said groove or grooves exist only in an inner area of said opposite side of said adhesive layer and are not open at side surfaces of said adhesive layer. The present invention also provides a release liner for an adhesive sheet having embosses on its surface and being good in smoothness.

21 Claims, 7 Drawing Sheets

ADHESIVE SHEET AND A RELEASE LINER

FIELD OF THE INVENTION

The present invention relates to an adhesive sheet comprising an adhesive layer on one side of a resin film, particularly, to an adhesive sheet wherein the resin film does not cause significant shrinkage when it is stored together with a release liner thereon for a prolonged time. The present invention relates also to a release liner. In particular, the present invention relates to a release liner for an adhesive sheet, having embosses and being excellent in terms of smoothness. The present invention relates further to an adhesive sheet with a release liner, comprising the aforementioned adhesive sheet and the aforementioned release liner.

BACKGROUND OF THE INVENTION

An adhesive sheet comprising an adhesive layer on one side of a resin film is covered with a release liner and stored. Generally, a release liner which is composed of paper or an drawn resin film such as drawn PET or OPP has a shrinkage rate of from about 0 to 0.2% when it is stored at ambient temperature for more than three months. Meanwhile, a resin film for an adhesive sheet is formed in a heat rolling or extruding process and sometimes shrinks by about 1% or more under the same storage conditions as mentioned above. As a result, after storage, wrinkles or curls appear on the adhesive sheet, or the edge of release liner runs out of the edge of the adhesive sheet since the dimension of the release liner does not change but that of the adhesive sheet does. These problematic phenomena deteriorate the appearance of the adhesive sheet.

Another problem is that when an adhesive sheet is applied on an article, air tends to remain between the adhesive layer of the adhesive sheet and the article, which also deteriorates the appearance of the adhesive sheet or impairs adhesion to an article. To resolve these problems, the following literature Nos. 1-6 disclose methods wherein an adhesive sheet is provided with small projections or concave-convex structure on a surface of the adhesive layer, or with continuous grooves as shown in FIG. 1 to form paths for air to flow toward the side surfaces of the adhesive layer.

However, the aforesaid deterioration of appearance caused by shrinkage of the resin film, which occurs when the adhesive sheet is stored together with a release liner thereon, still remains unsolved. Further, when the adhesive sheet with grooves on its adhesive layer as described above is applied to an article, the adhesive agent flows toward the grooves, so that the shape of the grooves on the adhesive layer changes. This change in the shape of the grooves and the flow of the adhesive agent near the grooves affect the appearance of the resin film which is located on the side opposite to the grooves of the adhesive layer, so that a crater-like pattern appears on the surface of the adhesive sheet as if the adhesive sheet is embossed, which significantly deteriorates the appearance of the adhesive sheet after applied.

Meanwhile, paper or a drawn resin film is used as a substrate for a release liner for an adhesive sheet.

For instance, in known release liners with a paper substrate, one or both sides of the paper is treated with a releasing agent such as silicone, or a polyolefin resin is laminated to one or both sides of the paper and the surface of the resin is treated with a releasing agent such as silicone. Paper surface tends to be unlevel. Therefore this is laminated with a polyolefin resin in order to make the unlevelness of the surface of paper less noticeable. Suppression of the concavity and convexity of the paper surface improves surface smoothness of a release liner and, accordingly, smoothness of an adhesive sheet. However, even when a polyolefin resin is laminated with paper, it is difficult to completely eliminate the concavity and convexity of paper. Accordingly, when a release liner with a paper substrate is applied to an adhesive sheet, the concavity and convexity on the release liner surface are transferred to the adhesive layer of the adhesive sheet, so that the adhesive sheet has a drawback that concavo-convex pattern appears on the surface of the adhesive sheet opposite to the side which is in contact with the release liner, when the adhesive sheet is applied to an article. Particularly, in a case of high gloss adhesive sheet which has a mirror-like surface with high gloss, such concavo-convex pattern on the surface deteriorate the mirror-like property and, therefore, such a release liner is unsuitable.

Also known is a release liner, where a surface of a polyolefin resin laminated to paper is treated with a releasing agent and further provided with embossing finish. This liner is suitable for use in adhesive sheets having grooves on the surface of the adhesive layer, but unsuitable for such a high gloss adhesive sheet that has a mirror-like surface with high gloss because concavo-convex pattern caused by paper still remains on the liner surface even when embossing finish is provided.

A release liner where a drawn resin film, such as a drawn PET or OPP, is used as a substrate is also known. A drawn resin film is good in smoothness and, therefore, even when it is applied to an adhesive sheet that has a mirror-like surface with high gloss, smoothness of the adhesive sheet is not impaired. However, the above-mentioned drawn resin film is less suitable for embossing and, therefore, may not be embossed. For instance, a drawn PET has a high melting point of 258 degrees C. and, therefore, it is difficult to supply enough heat to PET to soften it for embossing with a heat roll or the like. If OPP is heated around a melting point, the heating causes significant shrinkage and, therefore, it may not be used as a release liner any more.

Also known is a release film where a release layer of polyolefin is laminated to a polyester film (see, for instance, Patent Literature 7). This release film may have concavo-convex surface caused by deposit of fine particles which are added to improve a sliding property and is not provided with embossing finish. The polyester film is from 5 to 100 micrometers thick.

1. Japanese Utility Model Registration No. 2503717,
2. Japanese Utility Model Registration No. 2587198,
3. Published Japanese Translation of PCT Patent Application No. 9-504325,
4. Japanese Patent Application Laid-Open No. 11-209704,
5. Published Japanese Translation of PCT Patent Application No. 2002-544364,
6. Korean Patent No.253460, and
7. Japanese Patent Application Laid-Open No. 10-114036.

Figure 1:
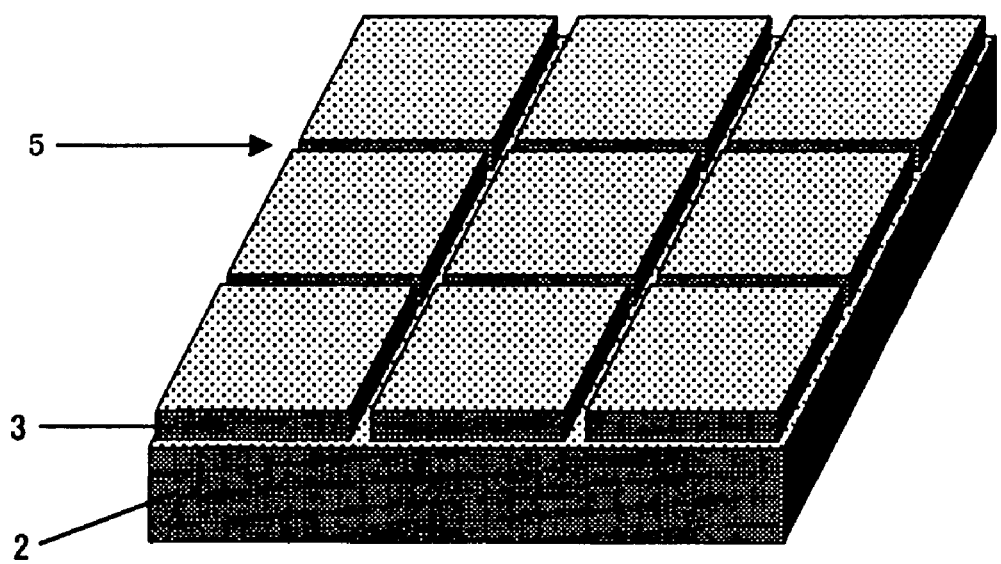
FIG. 1 is a schematic view of a conventional adhesive sheet.

In the drawings, the numerals and the alphabetic symbols mean the following:
1: Adhesive sheet
2: Resin film
3: Adhesive layer
4: Groove
5: Groove
6: Substrate film
A: Polyolefin resin layer
B: Polyolefin resin layer

DISCLOSURE OF THE INVENTION

The present invention aims to provide an adhesive sheet comprising an adhesive layer on one side of a resin film, wherein there is no difference in shrinkage between the resin film and the release liner and, therefore, good appearance of the adhesive sheet is maintained after stored with a release liner thereon for a prolonged time. Further the adhesive sheet has good appearance and an adequate adhesion force when it is applied to an article. The present invention also provides a release liner for the adhesive sheet.

Thus, the present invention provides an adhesive sheet comprising a resin film and an adhesive layer adhering to one side of the resin film, wherein the adhesive layer has one or more grooves on a side opposite to a side on which the adhesive layer adheres to the resin film, the groove or grooves exist only in an inner area of the opposite side of adhesive layer and are not open at side surfaces of the adhesive layer.

In another embodiment of the present invention, the aforementioned adhesive layer further has a groove or grooves which are open at the side surfaces of the adhesive layer on the aforementioned opposite side.

The present invention also provides a release liner, comprising a substrate film with a thickness of from 50 to 150 micrometers and a polyolefin resin-containing layer on one or both sides of the substrate film, with the polyolefin resin being not ethylene-methacrylic acid copolymers or ionomers thereof, wherein at least one of the polyolefin resin-containing layers has embosses on a side opposite to a side which is in contact with the substrate film; the substrate film comprises one or more selected from the group consisting of polyethylene terephthalate, polyethylene terephthalate with inner cavities, copolymer of phthalic acid isomers and ethylene glycol, polyethylene naphthalate, polybutylene terephthalate, and polytrimethylene terephthalate; and the thickness of the polyolefin resin-containing layer is 10 micrometers or more and is at most 0.3 times the thickness of the substrate film when the polyolefin resin-containing layer exists only on one side of the substrate film, or 10 micrometers or more and is at most 0.5 times the thickness of the substrate film, with the ratio of the thickness of the two layers being from 0.3 to 1, when the polyolefin resin-containing layers exist on both sides of the substrate film.

According to another embodiment of the present invention, the aforementioned embosses are formed so that the surface comprising embosses has surface structure complementary to the adhesive layer of the aforementioned adhesive sheet.

The present invention also provides an adhesive sheet with a release liner comprising the aforementioned adhesive sheet and the aforementioned release liner.

SUMMARY OF THE INVENTION

The adhesive sheet of the present invention comprises a resin film and an adhesive layer on one side thereof, wherein there is no difference in shrinkage rate between the resin film and the release liner and, therefore, a good appearance is maintained after stored with release liner thereon for a prolonged time, and the adhesive sheet has a good appearance and a good adhesion force when it is applied to an article.

The release liner of the present invention has embosses on its surface and, therefore, the release liner is useful as a release liner for an adhesive sheet having grooves on a surface of an adhesive layer. The release liner of the present invention is also good in smoothness and, therefore, it is useful, in particular, as a release liner for a high gloss adhesive sheet whose surface opposite to the adhesive layer is a mirror-like surface and has high gloss.

PREFERRED EMBODIMENTS OF THE INVENTION

The adhesive sheet of the present invention will be elucidated by referring to the drawings.

Figure 2:
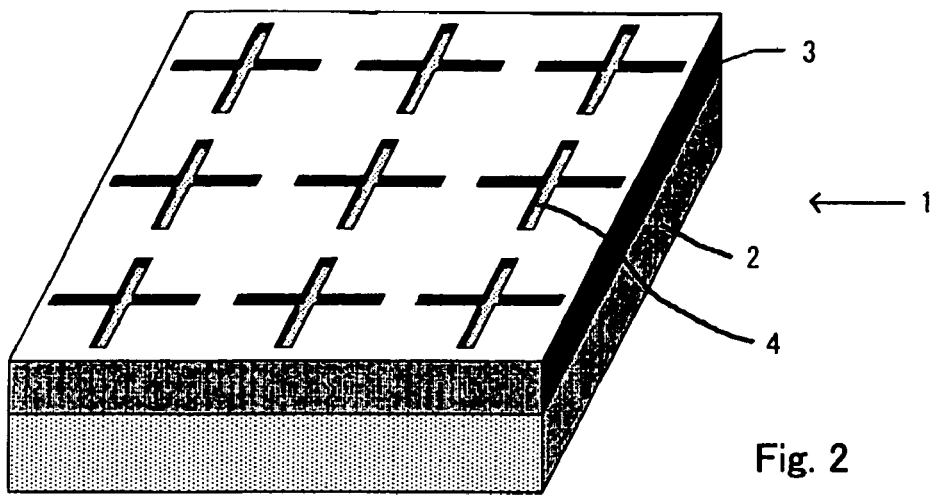
FIG. 2 is a schematic view of an adhesive sheet of the present invention.

FIG. 2 shows the adhesive sheet according to one embodiment of the present invention. As shown in FIG. 2, Adhesive Sheet 1 according to the present invention comprises Adhesive Layer 3 adhering to one side of Resin Film 2, and the adhesive layer has one or more Grooves 4 on a surface opposite to the surface adhering to the resin film. In this embodiment, the aforementioned grooves exist only in an inner area of the aforementioned opposite side and are not open at the side surfaces of the adhesive layer.

After it is stored for a prolonged time together with a release liner which has structure complementary to the surface structure of the adhesion layer, there is no difference in shrinkage rate between the Resin Film 2 and the release liner. This is because Grooves 4 engage with the complementary structure of the release liner, not shown in the figure, so that the shrinkage of the adhesive sheet is suppressed, which is referred to as "anchor effect".

As described above, the adhesive agent flows generally towards the grooves in an adhesive layer of an adhesive sheet to deform the grooves on the surface of the adhesive layer. The deformation reaches the side adhering to a resin film to cause dents on the surface of the adhesive sheet. This deteriorates the appearance of the adhesive sheet after applied. However, in the adhesive sheet of the present invention, discontinuous grooves are present on the adhesive layer and therefore the deformation of the grooves, which is caused by the flow of the adhesive agent towards the grooves, is suppressed by the adhesive agent existing around the grooves. As a result, a good appearance is maintained after the adhesive sheet is applied to an article.

Figure 3:
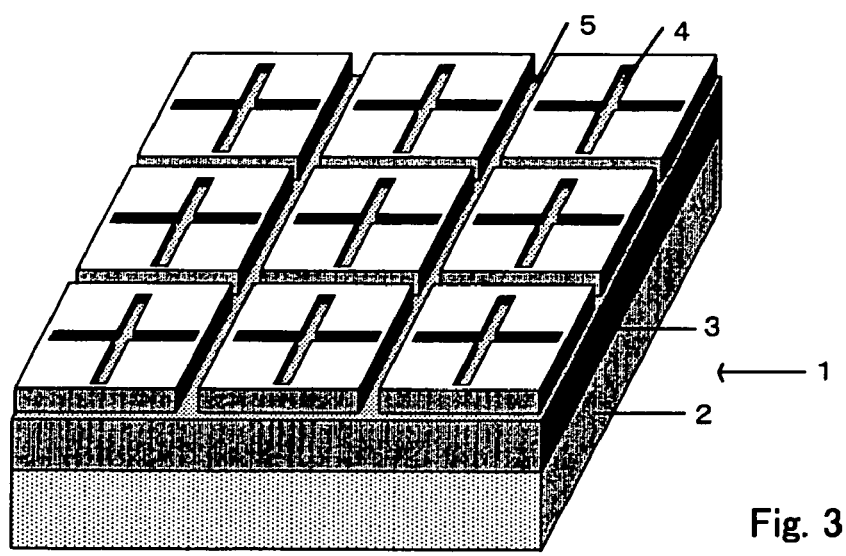
FIG. 3 is a schematic view of another adhesive sheet of the present invention.

FIG. 3 shows the adhesive sheet according to another embodiment of the present invention. As shown in FIG. 3, the adhesive sheet of the present invention may further have Grooves 5 which are open at the side surfaces of the adhesive layer on the opposite side.

In the above-described adhesive sheet, Grooves 4 are added to a conventional adhesive sheet having Grooves 5 only. By adding Grooves 4, the above-described anchor effect is obtained. The adhesive sheet has both Grooves 4 and 5. Therefore, when the deformation due to the flow of the adhesive agent reaches the resin film, stress is delocalized more than in conventional adhesive sheets where Grooves 5 alone are provided for deaeration. Therefore, less dents appear on the surface of the adhesive sheet. Accordingly the adhesive sheet of the present invention can maintain good appearance after stored with a release liner thereon as well as after applied to an article.

Figure 4:
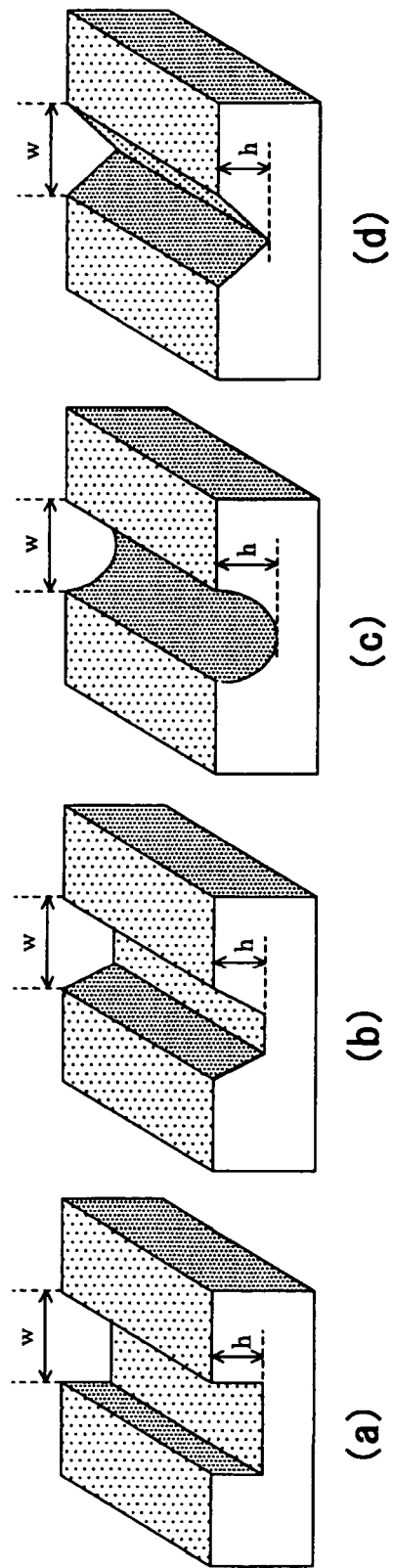
FIG. 4 is an enlarged partial view of grooves in adhesive sheets of the present invention. The sectional shape of the groove is tetragonal in FIG. 4(a); trapezoidal in FIG. 4(b); U-shaped in FIG. 4(c); and triangular in FIG. 4(d).

The groove in the present invention may have any shape. Preferably its cross-section is selected from (a) rectangle, (b) trapezoid, (c) U-shaped form, and (d) triangle, each having a width of 5 to 100 micrometers and a depth of 5 to 50 micrometers, as shown in FIG. 4, where "w" means the width of the groove and "h", means the depth of the groove. If the width is too large, a larger amount of the adhesive agent flows toward the grooves upon the adhesive sheet being applied and, accordingly, the appearance of the adhesive sheet after applied is impaired.

Figure 5:
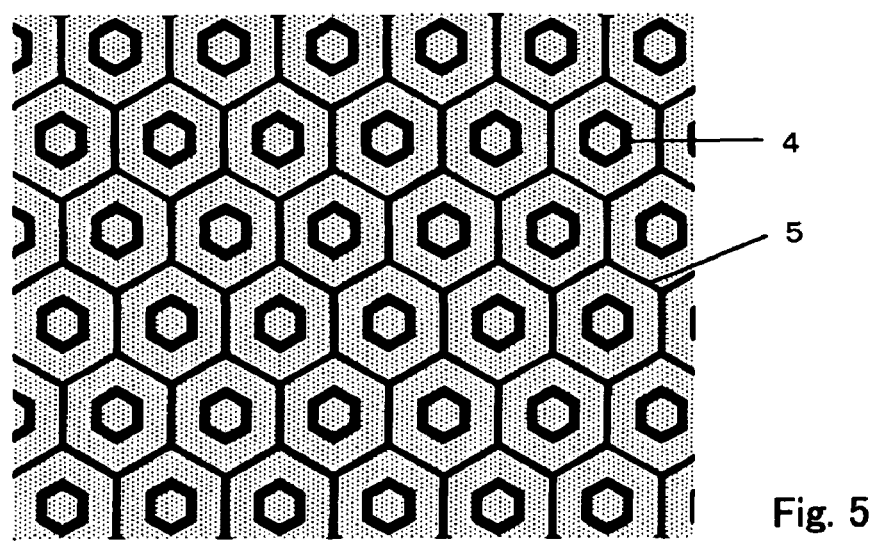
FIG. 5 is an enlarged partial front view of an adhesive layer in an adhesive sheet of the present invention.
Figure 6:
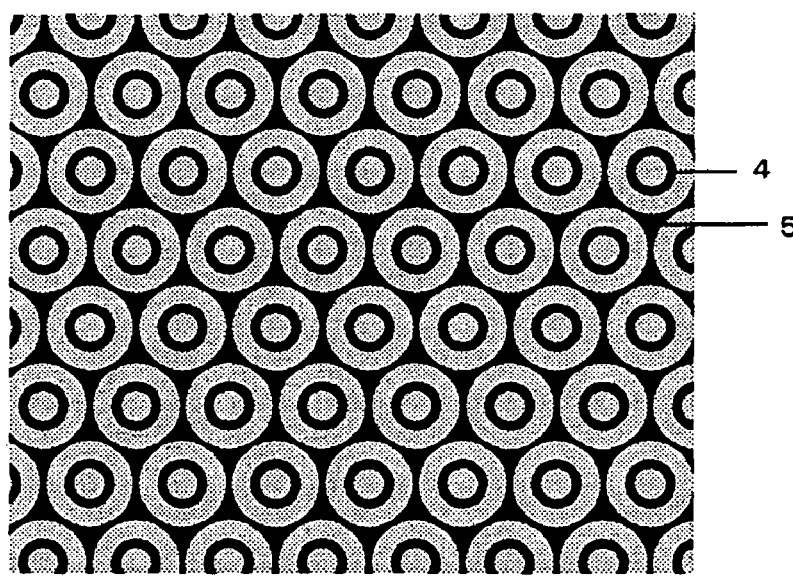
FIG. 6 is an enlarged partial front view of another adhesive layer in an adhesive sheet of the present invention.

The grooves may be of various shapes or patterns in the front view of the surface of the adhesive layer having grooves. Examples are shown in FIGS. 5 and 6. FIGS. 5 and 6 are front views of the adhesive layer which has both Grooves 4 which are not open at the side surfaces and Grooves 5 which are open at the side surfaces, where dark areas represent the grooves.

Figure 7:
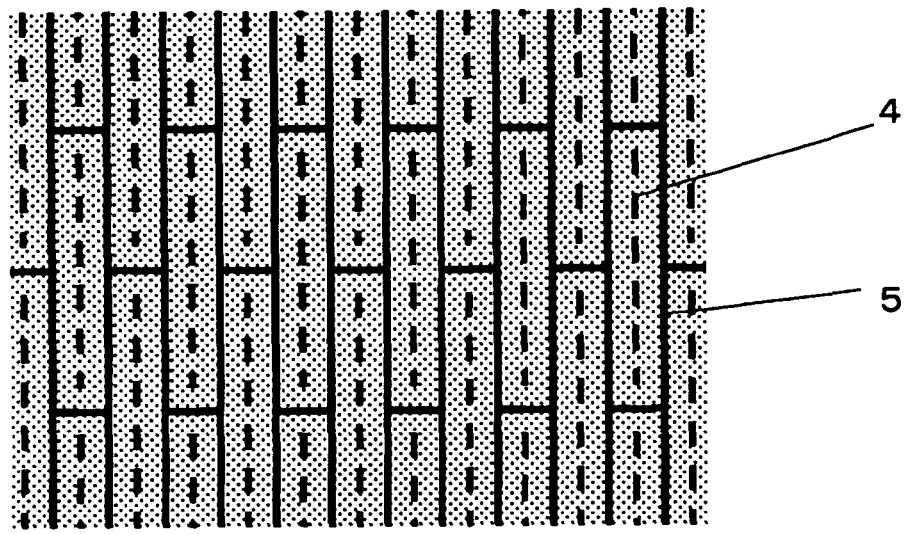
FIG. 7 is an enlarged partial front view of another adhesive layer in an adhesive sheet of the present invention.

In the front view of the surface of the adhesive layer having grooves, Grooves 4 which are not open at the side surfaces may be of a shape of straight line, branched straight lines, cross, circle, oval or polygon such as tetragon or hexagon. Each shape may be composed of plural discontinuous grooves. In FIGS. 2 and 3 mentioned above, Grooves 4 are of a form of cross. Grooves 4 are of a form of hexagon in FIG. 5 and Grooves 4 are of a form of circle in FIG. 6. FIG. 7 shows an example where straight lines are composed of plural discontinuous Grooves 4.

One or more, preferably many, Grooves 4 exist in the adhesive layer and more preferably they exist in a density of from $1 \times 10$ to $3.7 \times 10^6$ per $cm^2$, even more preferably, from $1 \times 10^2$ to $3.7 \times 10^5$ per $cm^2$.

In the front view of the surface of the adhesive layer having grooves, Grooves 5 which are open at the side surfaces may be arranged in a stripe pattern or may be arranged so that each section partitioned by the grooves is of a shape of circle, oval, or polygon such as tetragon and hexagon. In FIG. 3, Grooves 5 are arranged in a lattice-like shape and each section of the adhesive layer partitioned by the grooves is of a shape of tetragon. In FIGS. 5, 6, or 7, Grooves 5 are arranged so that each section of the adhesive layer partitioned by the above-mentioned grooves is in a form of hexagon, circle, or tetragon, respectively.

Grooves 4 and 5 may be arranged either at random or in a regular pattern on the surface of the adhesive layer.

For the resin film in the adhesive sheet of the present invention, conventional resin films which have been used therefor may be used. Examples of the resin include polyvinyl chloride resins, polyolefin resins such as polypropylene resin, polyester resins such as polyethylene terephthalate resins such as PETG, urethane resins, acrylic resins, and modified resins, copolymers, and metal salts and mixtures thereof, but are not limited thereto. The thickness of the resin films may vary widely, depending on desired applications and ranges generally from 30 to 500 micrometers, preferably from 50 to 200 micrometers.

The adhesive agent used in the present invention is known as such and may be selected depending on the kind of articles to which the adhesive agent is to adhere. Examples of the adhesive agent include acrylic adhesives, urethane adhesives, polyester adhesives, and silicone adhesives. Preferred are acrylic adhesive and urethane adhesive. The thickness of the adhesive layer depends on the purpose of the adhesive sheet and preferably is in the range of from 5 to 50 micrometers.

In order to enhance the adhesion strength between the resin film and the adhesive layer in the adhesive sheet according to the present invention, the surface of the resin film to which the adhesive agent is to be applied may be subjected to primer coating, corona discharge treatment, plasma discharge treatment or the like in advance. Primers or gases to be used in plasma discharge may be suitably selected in accordance with the properties of the resin film or the adhesive agent which composes the adhesive sheet.

The surface of the resin film in the adhesive sheet of the present invention, to which the adhesive layer is not applied, may be provided with surface-protecting coating or gloss coating, or may be printed by gravure, silk screen, off-set, or ink-jet printing.

The resin film of the adhesive sheet of the present invention may be laminated in advance with a resin film of the same or different resin on its surface to which the adhesive layer is not applied. The lamination may be done in a heat lamination method, a wet or dry lamination method using an adhesive in combination with heat, or a method using a pressure-sensitive adhesive.

The adhesive sheet of the present invention can be manufactured in a common method. For example, it can be manufactured by applying a layer of an adhesive on a surface of a resin film and then laminating the adhesive layer with a release liner having surface structure complementary to the desired surface structure of the adhesive layer. Alternatively, it can be obtained by applying an adhesive on a release liner having a complementary surface structure to provide grooves on the adhesive layer, and then laminating the adhesive layer with a resin film.

In the following, the release liner of the present invention will be elucidated. The release liner of the present invention comprises a substrate film and a polyolefin resin-containing layer on one or both sides of the substrate film. The polyolefin resin-containing layer on said one or both sides has embosses on a side opposite to a side which is in contact with the substrate film.

The substrate film of the release liners of the present invention comprises one or more selected from the group consisting of polyethylene terephthalate, polyethylene terephthalate with inner cavities, copolymer of phthalic acid isomers and ethylene glycol, polyethylene naphthalate, polybutylene terephthalate, trimethylene terephthalate, polyarylate, polyether ether ketone, polyether sulfone, polylactic acid, triacetyl cellulose, and polycarbonate. Preferably, the aforementioned film comprises polyethylene terephthalate, polyethylene terephthalate with inner cavities or copolymer of phthalic acid isomers and ethylene glycol.

The aforementioned film preferably has flexural strength by loop stiffness of from 0.2 to 1.5 N/25 mm and a yield point load of from 50 to 200 N/10 mm. If the aforementioned values are less than the lowest limits, the resulting release liner tends to cause curling at its edges and, therefore, the handling property is poor. Above the upper limits, the resulting release liner is too stiff for use as a release liner material.

The aforementioned film is preferably a biaxially drawn film. As a commercially available biaxially drawn film, mention may be made of Emblet S 125 from Unitika and Tetron™ S 100 from Teijin.

The thickness of the substrate film may be from 50 to 150 micrometers, preferably from 100 to 150 micrometers, and more preferably from 100 to 125 micrometers. If the substrate is thinner than 50 micrometers, the resulting release liner tends to cause curling. If the substrate is thicker than 150 micrometers, the substrate is too thick to be suitably used as a release liner material.

The release liner of the present invention comprises a polyolefin resin-containing layer on one or both sides of the aforementioned substrate film. As the aforementioned polyolefin resin, mention may be made of (co)polymers of one or more olefins selected from, for instance, ethylene, propylene, butylene, and butadiene. The polyolefin cannot be ethylene-methacrylic acid copolymers or the ionomers thereof. Preferably, the polyolefin resin is selected from polyethylene resins and polypropylene resins, specifically low density polyethylene (LDPE), medium density polyethylene (MDPE), high density polyethylene (HDPE), and polypropylene (PP). Particularly preferably, the polyolefin resin is LDPE.

The polyolefin resin preferably has a Vicat softening point of from 80 to 150 degrees C. as determined according to JIS K 7206. If the Vicat softening point is lower than the lower limit, embosses are difficult to be retained. If the Vicat softening point is higher than the upper limit, emboss processing is difficult.

The polyolefin resins are also preferably resistant to hot solvents. The aforementioned polyolefin resins do not dissolve in organic solvents, such as toluene or ethyl acetate at an ambient temperature, but sometimes cause cracks or wrinkles at a temperature higher than 80 degrees C. In general, adhesives are diluted with toluene or ethyl acetate. If the polyolefin resin layer is not resistant to hot solvents when these adhesives are applied to a surface of polyolefin resin of a release liner and dried, abnormality takes place on the surface of the polyolefin resin layer, so that the appearance of the adhesive sheet is significantly deteriorated, which is undesirable.

The polyolefin resin-containing layer may comprise heat stabilizers or processing aids as required.

The polyolefin resin layer should be thicker than 10 micrometers. The thickness precision of a polyolefin resin layer is not high, so that the surface tends to be concavo-convex due to the unevenness of the surface thickness if the layer is thinner than 10 micrometers. As a result, a surface of a release liner may not be adequately smooth. The layer thickness should be equal to 10 micrometers or more also for the reason that embosses may be high enough to accommodate the aforementioned grooves. The release liner with the embossed polyolefin resin-containing layer tends to cause curling at its edges. In order to suppress this, the upper limit of the thickness of the polyolefin resin-containing layer is the thickness of the substrate film multiplied by 0.3 when the polyolefin resin-containing layer is provided only on one side of the substrate film; and thickness of the substrate film multiplied by 0.5 when the layers are provided on both sides of the film. If the polyolefin resin-containing layers are provided on both sides of the substrate film, the thickness of each layer is selected so that the thickness ratio of one layer to the other layer is from 0.3 to 1. When the polyolefin resin-containing layer is provided only on one side of the substrate film, the thickness of the polyolefin resin-containing layer is preferably 10 micrometers or more and is from one-tenth to a quarter of the substrate film thickness. When the polyolefin resin-containing layers are provided on both sides of the substrate film, the thickness of the polyolefin-containing layer is 10 micrometers or more and is from one-tenth to a quarter of the substrate film thickness, with the ratio of the thickness of each layer being from 0.5 to 1, more preferably from 0.6 to 1, even more preferably 1. The substrate film in a preferred release liner of the present invention is from 100 to 125 micrometers thick and the polyolefin resin-containing layer is from 15 to 25 micrometers thick. When the polyolefin resin-containing layers are provided on both sides of the substrate film, each layer is from 15 to 25 micrometers thick.

The release liner of the present invention may have a polyolefin resin layer on one or both sides of the substrate film as described above. The release liner preferably has polyolefin resin layers on both sides since curling of the release liner on its edges is suppressed more effectively. However, in terms of costs, the release liner having the polyolefin resin layer on one side is more advantageous. In the latter case, the curling may be suppressed by controlling the thicknesses of the substrate and the polyolefin resin layer within the above-described ranges.

At least one polyolefin-containing layer in the present release liner has embosses on a side opposite to a side which is in contact with the substrate film. Preferably, the aforementioned embosses are formed so as to be complementary to the aforementioned grooves, so that the release liner may be applied to an adhesive sheet having grooves on a surface of its adhesive layer. More preferably, the aforementioned embosses are formed so that the surface having embosses has a surface structure complementary to the adhesive layer of the adhesive sheet of the present invention and thus the embossed release liner may be combined advantageously with the adhesive sheet of the present invention.

The release liner of the present invention may be manufactured by laminating a polyolefin resin-containing layer to one or both sides of a substrate film, embossing at least one polyolefin resin-containing layer, and then surface-treating the polyolefin resin-containing layer with a releasing agent, such as silicone. The above laminating may be performed by melt extruding a polyolefin resin on a substrate film and press them using cooling rolls or by preparing a film from a polyolefin resin in advance and then thermo-pressing the resulting film using heated rolls. Here, in order to improve adhesion between the substrate film and the polyolefin resin-containing layer, the surface of the substrate film, which surface is to be in contact with the polyolefin resin-containing layer, is preferably provided with anchor coat or subjected to treatment, such as corona treatment and plasma treatment, in advance. The embossing may be performed in a conventional process, for instance, by pattern pressing under heat using an engraving roll or an engraving plate.

In the following, the present invention will be further elucidated with reference to the Examples or Comparative Examples but not be limited thereto. The materials used in Examples and Comparative Examples and the test methods are as described below.

Materials
(1) PVC: S4660 FC25382, polyvinyl chloride from Riken Technos Corp.
(2) PP: TPP061 XZ025, polypropylene random copolymer from Riken Technos Corp.
(3) PETG: RIVESTAR TPT027 XZ025, completely amorphous polyester resin of a copolymer type from Riken Technos Corp.
(4) Acrylic adhesive: SK Dyne 1309 from Soken Chemical and Engineering Co., Ltd., composed of acrylic acid and acrylate ester.

(5) Curing agent: L-45 from Soken Chemical and Engineering Co., Ltd., composed of composition: tolylene diisocianate.
(6) Release liner: SLK-110AW #3000 from Kaito Chemical Industry Co., Ltd., prepared by laminating high quality paper with polyethylene, whose one side was then provided with silicone.
(7) PET: Emblet S 100 from Unitika, bi-axially drawn polyethylene terephthalate.
(8) PET with inner cavities: Crisper K 1212 from Toyobo, bi-axially drawn polyethylene terephthalate with inner cavities.
(9) PET with phthalic acid isomers: Teflex FT from Teijin DuPont Films, bi-axially drawn copolymer of isophthalic acid, terephthalic acid, and ethylene glycol.
(10) OPP: 80 RL-01 from Oji Paper Co., Ltd., bi-axially drawn polypropylene.
(11) Acrylic resin: 010-NCH from Kanegafuchi Chemical Ind.
(12) High quality paper: OK Shoe Cream from Oji Paper Co., Ltd., weight of a sheet of paper: 104.7 g/m$^2$.
(13) LDPE: Mirason 12 from Mitsui Chemicals, low density polyethylene, Vicat softening point (JIS K 7206): 100 degrees C.
(14) HDPE: Hizex 7000 F from Mitsui Chemicals, high density polyethylene, Vicat softening point (JIS K 7206): 125 degrees C.
(15) Homo PP: F107DV from Mitsui Polypro, homopolypropylene, Vicat softening point (JIS K 7206): 150 degrees C.
(16) Soft PVC: DN FC13841 from Riken Technos Corp., soft polyvinyl chloride, Vicat softening point (JIS K 7206): 70 degrees C.
(17) Ionomer: Himiran 1605 from Mitsui-DuPont Chemical Co., Ltd. sodium salt of an ethylene-methacrylic acid copolymer, Vicat softening point (JIS K 7206): 75 degrees C.).

Figure 8:
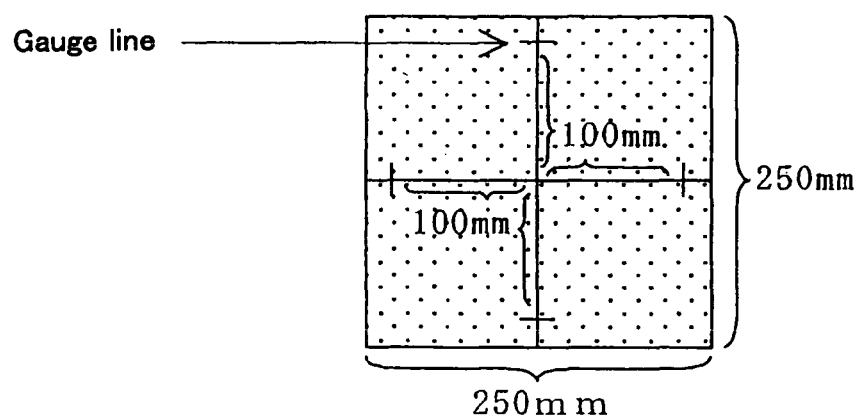
FIG. 8 is a schematic drawing to explain gauge lines.

Test Method (1) Shrinkage Test:

The test is performed according to JIS K 7133, "Method for Determination of Dimensional Change of Plastic Films and Sheets by Heating." First, an adhesive sheet with a release liner is cut into a dimension of 250 mm×250 mm. Then two lines are drawn in the longitudinal and transversal directions through the centers on the resin film side and the release liner side of the cut sheet, as shown in FIG. 8, and four gauge lines are drawn at 100 mm apart from the crossing point of the above two lines as shown in FIG. 8 to prepare a specimen.

The distances between the two gauge lines on the longitudinal and transversal lines both on the resin film side and the release liner side of the specimen are determined with a scale which has a precision of 0.5 mm. An average distance between the gauge lines on the longitudinal line and the transversal line is referred to as $L_{f0}$ and $L_{s0}$ for the resin film side and the release liner side, respectively. Then the specimens are stored at ambient temperature for a week, at a temperature of 80 degrees C. for a week, or at ambient temperature for three months. After the storing, each specimen is left at ambient temperature for 1 hour and then the distances between the gauge lines are determined again as described above. An average distance between the gauge lines on the longitudinal line and the transversal line is referred to as $L_f$ and $L_s$ for the resin film side and the release liner side, respectively. The shrinkage rates in % of the resin film and the release liner, delta $L_f$ and delta $L_s$, are calculated according to the following formula (1).

$$\text{delta } L_x = (L_x - L_{x0})/L_{x0} \times 100 \quad (1)$$

$L_{x0}$: distance in mm between the gauge lines before the storage and $L_x$: distance in mm between the gauge lines after storage, wherein x=f or s Further the shrinkage rate of the resin film, delta $L_f$, is subtracted from that of the release liner delta $L_s$, to obtain the difference between the rates, delta L=delta $L_s$–delta $L_f$.

(2) Appearance Test:

First, a surface of a smooth glass plate is cleaned with a gauze soaked with isopropyl alcohol and then further wiped with a dry gauze. This procedure is repeated three times. Then an adhesive sheet with a release liner is cut into a dimension of 297 mm×210 mm, the release liner is peeled off, and the adhesive sheet is let to adhere to the glass plate and left at ambient temperature for 1 hour or at a temperature of 80 degrees C. for 168 hours to prepare a specimen for evaluation.

The specimen for evaluation is placed under day light or 50 cm below a white fluorescent light of 40 W with the illumination intensity of 300 lux, and visually evaluated for any repeating pattern caused by the grooves of the adhesive layer on the surface of the adhesive sheet. The evaluation is made by comparing the specimen with a comparative specimen prepared from an adhesive sheet having the corresponding resin film according to Comparative Examples 1, 2, or 3.

The rating is based on the following criteria: when a repeating pattern is not seen on the surface of the adhesive sheet and its appearance is as good as that of the specimen from Comparative Example 1, 2, or 3, the specimen is rated as +; when the surface is slightly concavo-convex, the specimen is rated as –; and when a regular pattern is clearly observed, the specimen is rated as – –.

(3) Adhesion Test:

A test is performed based on JIS Z 0237, "Test Method for Adhesive Tapes/Sheets". First, an SUS304 steel panel as specified in JIS G 4305 is ground with water-resistant abrasive paper so that an average roughness, $R_a$, in a central line is 0.05 micrometers <Ra<0.40 micrometers and the maximum difference between peaks and valleies on the ground panel surface, $R_{max}$, is less than 3 micrometers. The surface of the steel panel is well cleaned with gauze soaked with isopropyl alcohol and then further wiped with a dry gauze. This cleaning procedure is repeated three times. The steel panel after the cleaning is kept in an atmosphere at a temperature of 23±2 degrees C. and a relative humidity of 50±5% for at least 5 minutes. Meanwhile the adhesive sheet is cut into a dimension of 250 mm×25 mm.

Then a release liner is peeled off from the cut adhesive sheet and the exposed surface of the adhesive layer is put to the panel by running a roller, back and forth twice at a rolling speed of approximately 20 mm/second so that no bubbles remain between the adhesive layer and steel panel to obtain a test specimen. The roller is covered with a rubber layer with a thickness of 6 mm and a spring hardness of 80±5 Hs as specified in JIS K 6253 and has a width of 45 mm, a diameter of 95 mm, and a weight of 2000±50 g. This specimen is kept in an atmosphere at a temperature of 23±2 degrees C. and a relative humidity of 50±5% for 30 minutes to determine adhesive strength in initial state, or for 24 hours to determine adhesive strength in original state.

Then a margin of the adhesive sheet where the adhesive is not applied is folded back in 180 degrees and peeled off by approximately 40 mm. This is held by a clamp of a tensile testing machine, Autograph AG-100A from Shimadzu. Then the other edge of the steel panel is held by the other clamp of the testing machine. Subsequently the specimen is continuously peeled off at a rate of 300±30 mm/minute to determine tensile stress. Four values are taken at four points at intervals of 20 mm on the steel panel. The averaged value of the four is taken as adhesive strength.

(4) Contact Area Ratio:

First, a surface of a smooth glass plate is cleansed with gauze soaked with isopropyl alcohol and then further wiped with a dry gauze. This procedure is repeated three times. Then, an adhesive sheet is cut into a dimension of 50 mm×50 mm and the release liner is peeled off. The cut sheet is let to adhere to the glass plate, and kept at ambient temperature for 1 hour to prepare a specimen. Subsequently the surface of the adhesive layer of the adhesive sheet is photographed from the glass plate side with a laser microscope with a super depth of field, VK-8500 from Keyence, to obtain a total area of the adhesive sheet wherein the photographed field, $S_1$, and a contact area where the adhesive sheet adheres completely to the glass plate, $S_2$. A contact area ratio is calculated in accordance with the formula (2).

$$S=S_2/S_1\times 100 \tag{2}$$

$S_1$: total area in mm² of the adhesive sheet and
$S_2$: contact area in mm² of the adhesive sheet which is in contact with the glass panel.

(5) Evaluation Test of a Release Liner for Embossing

First, before embossing, a laminated film composed of a substrate film and a polyolefin resin-containing layer is cut into a dimension of 250 mm×250 mm. Then an emboss roll heated to 130 degrees C. and a silicone rubber roll are pressed to each other and rotated. The cut laminated film is inserted between two rotating rolls to be embossed and thus a test specimen is prepared. During the embossing, a moving velocity of the laminated film is kept at 5 m/minute. After the embossing, the specimen is left at ambient temperature for 1 hour and then the surface of the specimen is observed visually and then with, a microscope with a super depth of field for observing shape, VK-8500 from Keyenece to confirm whether embosses are formed or not. When no abnormal appearance such as a big wrinkle, crack, hole, or big shrinkage is observed, but the shape of the embosses is incomplete, the specimen is rated as +; when no abnormal appearance is observed and embosses are formed insufficiently, the specimen is rated as −; and when no embosses are formed at all or abnormal appearance is observed, the specimen is rated as −−.

(6) Shrinkage Rate Test of a Release Liner During Embossing:

This test is performed according to JIS K 7133, "Method for Determination of Dimensional Change of Plastic Films and Sheets by Heating." First, a laminated film composed of a substrate film and polyolefin resin-containing layer is cut into a dimension of 250 mm×250 mm. Then two lines are drawn in the longitudinal and transversal directions through the centers on a surface of the laminated film, as shown in FIG. 8, and four gauge lines are drawn at 100 mm apart from the crossing point of the above two lines as shown in FIG. 8 to prepare a specimen.

On the test specimen, the distances between the two gauge lines are determined with a scale which has a precision of 0.5 mm. An average distance is referred to as $L_{s0}$. Then an emboss roll heated to 130 degrees C. and a silicone rubber roll are pressed to each other and rotated. The cut laminated film is inserted between two rotating rolls to be embossed. During the embossing, a moving velocity of the laminated film is kept at 5 m/minute. After the embossing, the specimen is left at ambient temperature for 1 hour and the distance between the gauges is measured as described above and the average is referred to as $L_s$. The shrinkage rate of the release liner, delta $L_s$, is calculated according to the following formula (3).

$$\text{Delta } L_s=(L_s-L_{s0})/L_{s0}\times 100 \tag{3}$$

$L_{s0}$: distance in mm between the gauges before the embossing
$L_s$: distance in mm between the gauges after the embossing (7) Evaluation Test for Curling of a Release Liner:

First, before embossing, a laminated film composed of a substrate film and a polyolefin resin-containing layer is cut into a dimension of 250 mm×250 mm. Then an emboss roll heated to 130 degrees C. and a silicone rubber roll are pressed to each other and rotated. The cut laminated film is inserted between two rotating rolls to be embossed to prepare a test specimen. During the embossing, a moving velocity of the laminated film is kept at 5 m/minute. After the embossing, an evaluation test for curling is carried out (i) after the specimen is left at ambient temperature for 1 hour, or (ii) after the specimen is stored at a temperature of 80 degrees C. for 1 week and then left at ambient temperature for 1 hour. The evaluation test for curling is performed by putting the specimen on a smooth glass plate and then measuring, with a scale of a precision of 0.5 mm, a height of the edge of the curled specimen above the glass plate. When this height is less than 1 mm, a rating is ++; 1 mm or higher and lower than 3 mm, +; 3 mm or higher and lower than 5 mm, −; and 5 mm or higher, −−.

(8) Shrinkage Rate Test of a Release Liner:

This test is performed according to JIS K 7133, "Method for Determination of Dimensional Change of Plastic Films and Sheets by Heating." First, a release liner is cut into a dimension of 250 mm×250 mm. Then two lines are drawn in the longitudinal and transversal directions through the centers on a surface of the cut release liner as shown in FIG. 8, and four gauge lines are drawn at 100 mm apart from the crossing point of the above two lines as shown in FIG. 8 to prepare a specimen.

On the test specimen, the distances between the two pairs of the gauge lines on the longitudinal line and the transversal line are determined with a scale which has a precision of 0.5 mm. The average distance is referred to as $L_{s0}$. The specimens are stored at ambient temperature for 1 week, at 80 degrees for 1 week and at ambient temperature for 3 months. After the storing of each specimen, the specimens are left at ambient temperature for another 1 hour and the distance between the gauges is measured as described above and the average is referred to as $L_s$. The shrinkage rate of the release liner, delta $L_s$, is calculated according to the following formula (4).

$$\text{Delta } L_s=(L_s-L_{s0})/L_{s0}\times 100 \tag{4}$$

$L_{s0}$: distance in mm between the gauges before the embossing
$L_s$: distance in mm between the gauges after the embossing (9) Evaluation Test of a Resistance of Release Liner to a Hot Solvent:

First, a resulting release liner is cut into a dimension of 100 mm×100 mm. An acrylic adhesive agent, a curing agent, toluene and ethyl acetate are combined in a ratio by weight of 1000:6:100:100 and mixed well at ambient temperature for 2 minutes. One gram of this mixture is applied at a central part on the side having embosses of a release liner and dried at 100 degrees C. for 2 minutes. After the drying, the adhesive agent is removed to see whether cracks, wrinkles, float, change in gloss, and loss of embosses have occurred in the part which was in contact with the adhesive agent on the side of the release liner. When no abnormality is observed, the release liner is rated as +. When abnormality is observed, the release liner is rated as −.

(10) Applicability of an Adhesive Sheet:

First, a surface of a smooth glass plate is cleaned well with gauze soaked with isopropyl alcohol and then wiped with a dry gauze. This procedure is repeated three times. Then an adhesive sheet with a release liner is cut out to prepare two specimens with a dimension of 50 mm×50 mm. The release liners are peeled off from these adhesive sheets, and (i) one specimen is let to adhere to the glass plate so that an air bubble of 2 cm in diameter and 1 mm in height is formed at the center of the specimen, and (ii) the other specimen is let to adhere to the glass plate so that no air bubble is formed. Then the specimens are left at room temperature for 1 hour. The air bubble of the specimen (i) is pressed with a finger to visually observe whether the air bubble disappears and the same appearance is obtained as in the specimen (ii). If the specimen (i) has the same appearance with no air bubble as that of (ii), rating is +. If the air bubble does not disappear in (i), the rating is −.

(11) Evaluation Test for Smoothness of the Surface of an Adhesive Sheet:

First, a surface of a smooth glass plate is cleaned well with gauze soaked with isopropyl alcohol and then wiped with a dry gauze. This procedure is repeated three times. Then an adhesive sheet with a release liner is cut into a dimension of 150 mm×150 mm. The release liner is peeled off from the adhesive sheet, and the adhesive sheet is let to adhere to the glass plate so that an air bubble is not formed. Then the specimen is left at ambient temperature for 1 hour and the gloss value at 60 degrees is determined using a gloss checker from Horiba. When the value is 80 or more, the rating is +; from 60.0 to 79.9, −; and 59.9 or less, −−.

(12) Loop Stiffness Flexural Strength:

The loop stiffness flexural strength and the yield point load of the substrate films shown in Tables 4 and 5 are determined according to the following manners.

First a substrate film with a given thickness is cut into a dimension of 25 mm×200 mm to prepare a sample. Then the cut sample is held between the clamps of a Loop Stiffness Tester from TOYOSEIKI and a flexural strength is determined.

(13) Yield Point Load:

The determination is made according to JIS K 6734. First, a substrate film with a given thickness is cut into a dimension of 10 mm×100 mm to prepare a sample. Then the cut sample is fixed between the clamps of a tensile tester from Shimadzu, Autograph AG-100A, and a load is determined when the sample is pulled continuously at a rate of 300±30 mm/minute.

EXAMPLE 1

An embossing press panel engraved with cross-shaped Grooves 4 at intervals of 200 micrometers (i.e. a density of $2.5 \times 10^3 / cm^2$) as shown in FIG. 2, where Grooves 4 were not open at the side surface, each groove had a U-shaped cross-section with a width of 20 micrometers and a depth of 10 micrometers and the cross was 100 micrometers wide and 100 micrometers long, was pressed to release paper at a temperature of 140 degrees C. for 20 seconds, so that the emboss shape was transferred to the release paper to obtain Release Liner 1 which had a male surface structure.

Then an acrylic adhesive, a curing agent, and toluene and ethyl acetate as a solvent were combined in a ratio by weight of 1000:6:100:100 and mixed well at room temperature for 2 minutes. The resulting mixture was applied on Release Liner 1 and dried at 100 degrees C. for 2 minutes to obtain an adhesive layer with a thickness of 30 micrometers. Subsequently the adhesive layer was laminated with a PVC resin film with a thickness of 100 micrometers to obtain Adhesive Sheet A with a release liner.

Figure 9:
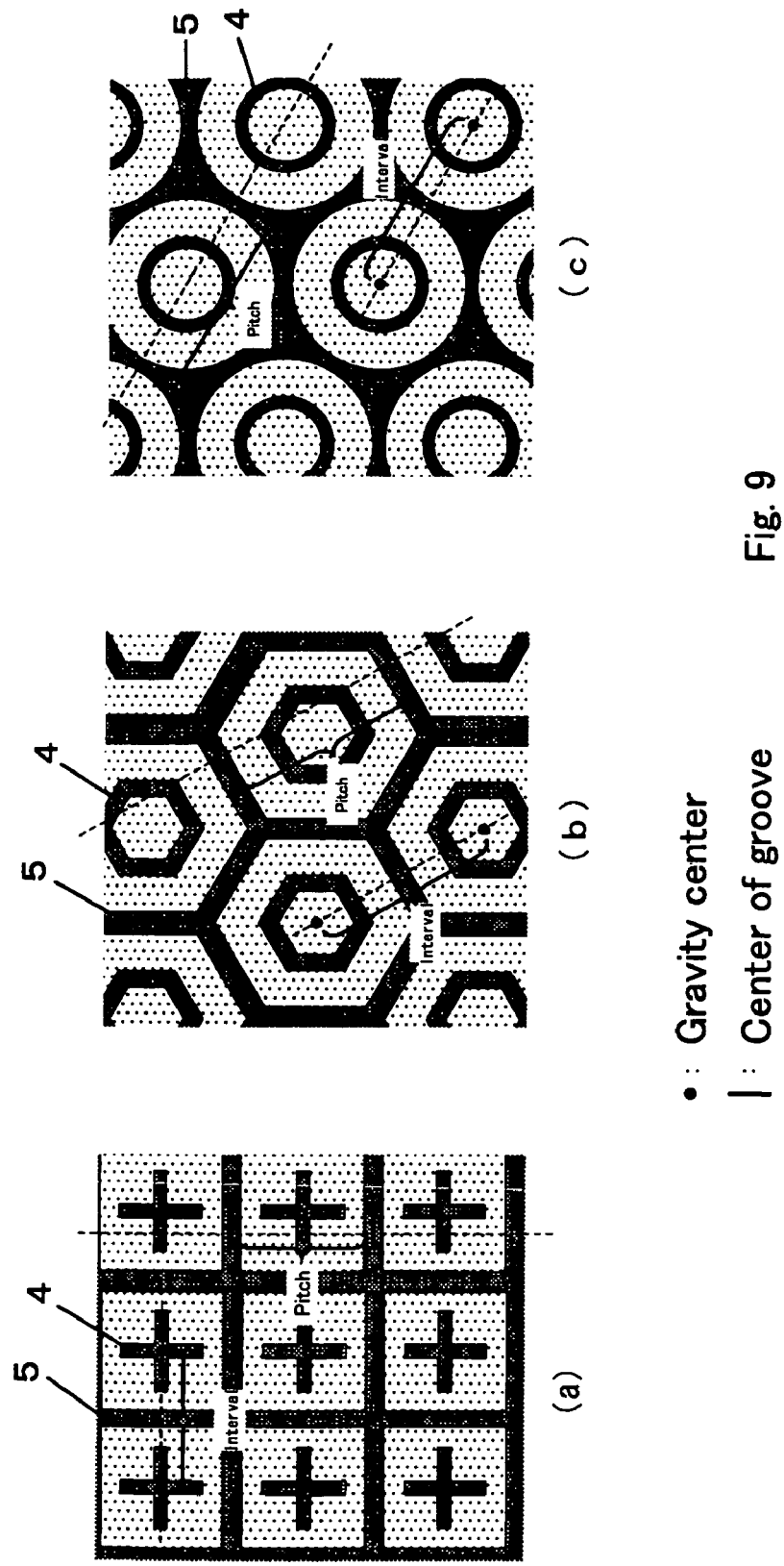
FIG. 9 is a schematic drawing to explain an interval and a pitch between grooves, wherein (a), (b), and (c) correspond to the front view of the adhesive layer in FIGS. 3, 5, and 6, respectively.

Here, the term "interval" means a distance between centers of gravity of Grooves 4 of two figures neighboring each other in a front view of an adhesive layer surface having grooves as shown in FIG. 9. In FIG. 9, dark areas represent grooves.

EXAMPLE 2

An embossing press panel engraved with hexagonal Grooves 4 at intervals of 400 micrometers (i.e. a density of $7.2 \times 10^2 / cm^2$) as shown in FIG. 5, where Grooves 4 were not open at the side surfaces, each groove had a U-shaped cross-section with a width of 30 micrometers and a depth of 15 micrometers and a side of the hexagon was 116 micrometers long, was pressed against a release liner at a temperature of 140 degrees C. for 20 seconds, so that the emboss shape was transferred to release paper to obtain Release Liner 2 which had a male surface structure. Using this release liner, Adhesive Sheet B with a release liner was obtained according to the same procedures as Example 1.

EXAMPLE 3 embossing press panel engraved with cross-shaped Grooves 4 at intervals of 100 micrometers (i.e. a density of $1.0 \times 10^4 / cm^2$) as shown in FIG. 2, where Grooves 4 were not open at the side surface, each groove had a U-shaped cross-section with a width of 20 micrometers and a depth of 10 micrometers and the cross was 50 micrometers wide and 50 micrometers long, was pressed to release paper at a temperature of 140 degrees C. for 20 seconds, so that the emboss shape was transferred to the release paper to obtain Release Liner 3 which had a male surface structure. Using this release liner, Adhesive Sheet C with a release liner was obtained according to the same procedures as Example 1.

EXAMPLE 4

An embossing press panel engraved with circular Grooves 4 at intervals of 1000 micrometers (i.e. a density of $1.2 \times 10^2 / cm^2$) as shown in FIG. 6, where Grooves 4 were not open at the side surfaces, each groove had a U-shaped cross section with a width of 50 micrometers and a depth of 20 micrometers and a diameter of the circle was 500 micrometers, was pressed to release paper at a temperature of 140 degrees C. for 20 seconds, so that the emboss shape was transferred to the release paper to obtain Release Liner 4 which had male surface structure. Using this release liner, Adhesive Sheet D with a release liner was obtained according to the same procedures as Example 1.

EXAMPLE 5

The procedures of Example 1 were repeated except that a PP resin film was used instead of the PVC film in Example 1 to obtain Adhesive Sheet E with a release liner.

EXAMPLE 6

The procedures of Example 1 were repeated except that a PETG resin film was used instead of the PVC film in Example 1 to obtain Adhesive Sheet F with a release liner.

Comparative Example 1

An adhesive agent and a curing agent were combined with toluene and ethyl acetate as solvet in a ratio by weight of 1000:6:100:100 and mixed well at room temperature for 2 minutes. This mixture was applied on release paper with no emboss treatment and dried at 100 degrees C. for 2 minutes to obtain an adhesive layer with a thickness of 30 micrometers. Subsequently the adhesive layer was laminated with a PVC resin film with a thickness of 100 micrometers to obtain Adhesive Sheet G with a release liner.

Comparative Example 2

The procedures of Comparative Example 1 were repeated except that a PP resin film was used instead of the PVC film in Comparative Example 1 to obtain Adhesive Sheet H with a release liner.

Comparative Example 3

The procedures of Comparative Example 1 were repeated except that a PETG resin film was used instead of the PVC film in Comparative Example 1 to obtain Adhesive Sheet I with a release liner.

The aforesaid tests (1) to (3) were performed on the adhesive sheets prepared in Examples 1 to 6 and Comparative Examples 1 to 3. The results are shown in Table 1.

TABLE 1

| | | Example 1 | Example 2 | Example 3 | Example 4 | Example 5 | Example 6 | Com. Ex. 1 | Com. Ex. 2 | Com. Ex. 3 |
|---|---|---|---|---|---|---|---|---|---|---|
| | Adhesive Sheet with release liner | A | B | C | D | E | F | G | H | I |
| Composition | Film resin | PVC resin | PVC resin | PVC resin | PVC resin | PP resin | PETG resin | PVC resin | PP resin | PETG resin |
| | Adhesive layer | Acrylic type | Acrylic type | Acrylic type | Acrylic type | Acrylic type | Acrylic type | Acrylic type | Acrylic type | Acrylic type |
| | Release liner | 1 | 2 | 3 | 4 | 1 | 1 | Release Paper | Release Paper | Release Paper |
| Grooves 4 | Interval in μm | 200 | 400 | 100 | 1000 | 200 | 200 | n.d. | n.d. | n.d. |
| | Density per cm$^2$ | $2.5 \times 10^3$ | $7.2 \times 10^2$ | $1.0 \times 10^4$ | $1.2 \times 10^2$ | $2.5 \times 10^3$ | $2.5 \times 10^3$ | n.d. | n.d. | n.d. |
| | Width of groove in μm | 20 | 30 | 20 | 50 | 20 | 20 | n.d. | n.d. | n.d. |
| | Depth of groove in μm | 10 | 15 | 10 | 20 | 10 | 10 | n.d. | n.d. | n.d. |
| | Shape of grooves | Cross | Hexagonal | Cross | Circular | Cross | Cross | n.d. | n.d. | n.d. |
| Performance | Appearance, ambient temp., 1 hr | + | + | + | + | + | + | + | + | + |
| | Appearance, 80° C., 168 hrs | + | + | + | + | + | + | + | + | + |
| | Shrinkage rate in % of a resin film, ambient temp., 1 week | 0 | 0 | 0 | 0 | 0 | 0 | 0.1 | 0.1 | 0.1 |
| | Shrinkage rate in % of release liner, ambient temp., 1 week | 0 | 0 | 0 | 0 | 0 | 0 | 0 | 0 | 0 |
| | Shrinkage rate in % of a resin film, 80° C., 1 week | 0.1 | 0.2 | 0.1 | 0.2 | 0.1 | 0.2 | 1.5 | 0.8 | 1.3 |
| | Shrinkage rate in % of release liner, 80° C., 1 week | 0.1 | 0.1 | 0.1 | 0.2 | 0.1 | 0.2 | 0.1 | 0.1 | 0.2 |
| | Shrinkage rate in % of a resin film, ambient temp. 3 months | 0.1 | 0 | 0.1 | 0.1 | 0 | 0 | 1.0 | 0.6 | 0.9 |
| | Shrinkage rate in % of release liner, ambient temp. 3 months | 0.1 | 0 | 0 | 0.1 | 0 | 0.1 | 0 | 0 | 0.1 |
| | Difference in shrinkage rate in %, ambient temp., 1 week | 0 | 0 | 0 | 0 | 0 | 0 | −0.1 | −0.1 | −0.1 |
| | Difference in shrinkage rate in %, 80° C., 1 week | 0 | −0.1 | 0 | 0 | 0 | 0 | −1.4 | −0.7 | −1.1 |
| | Difference in shrinkage rate in %, ambient temp., 3 months | 0 | 0 | −0.1 | 0 | 0 | 0.1 | −1.0 | −0.6 | −0.8 |
| | Adhesive strength (Initial state) in N/25 mm | 16.6 | 16.8 | 16.3 | 16.3 | 17.8 | 18.9 | 17.1 | 18.4 | 19.6 |
| | Adhesive strength (Normal condition) in N/25 mm | 20.1 | 19.8 | 19.5 | 20.1 | 20.9 | 22.4 | 20.3 | 21.5 | 22.8 |

"N.d." means that the value was unable to be determined

As is shown in Table 1, after storage with a release liner on, differences in the shrinkage rate between the resin film and the release liner are less in Adhesive Sheets A to F of the present invention, which have Grooves 4, in comparison to Adhesive Sheets G to I of the Comparative Examples 1 to 3, with no groove. Further, Adhesive Sheets of the present invention have the same adhesive strength and appearance as Adhesive Sheets of Comparative Examples 1 to 3.

EXAMPLE 7

An embossing press panel was prepared by engraving a panel with Grooves 5, which were open at the side surfaces and had a U-shaped cross-section with a width of 20 micrometers and a depth of 10 micrometers, at a pitch of 500 micrometers in such a lattice-like arrangement that the shape of each section partitioned by the above grooves would be tetragonal (see FIG. 3) and then further engraving each tetragonal section with cross-shaped Grooves 4 with a width of 250 micrometers and length of 250 micrometers, which were not open at the side surfaces and had a U-shaped cross-section with a width of 20 micrometers and a depth of 10 micrometers, at intervals of 500 micrometers (i.e. a density of $4.0 \times 10^2/cm^2$). Then the embossing press panel thus obtained was pressed to release paper at a temperature of 140 degrees C. for 20 seconds, so that the emboss shape was transferred to the release paper to obtain Release Liner 5 which had a male surface structure.

Then an acrylic adhesive and a curing agent were combined with toluene and ethyl acetate as solvent in a ratio by weight of 1000:6:100:100 and mixed well at room temperature for 2 minutes. The resulting mixture was applied on Release Liner 5 and dried at 100 degrees C. for 2 minutes to obtain an adhesive layer with a thickness of 30 micrometers. Subsequently the adhesive layer was laminated with a PVC resin film with a thickness of 100 micrometers to obtain Adhesive Sheet J with a release liner.

Here, the term "pitch" refers to a distance between the corresponding two points of two tetragons which neighbor each other in a front view of the side with grooves of the adhesive layer as shown in FIG. 9.

EXAMPLE 8

An embossing press panel was prepared by engraving a panel with Grooves 5, which were open at the side surfaces and had a U-shaped cross-section with a width of 30 micrometers and a depth of 15 micrometers, at a pitch of 500 micrometers so that the shape of each section partitioned by the above grooves would be hexagonal (see FIG. 5) and then further engraving each hexagonal section with hexagonal Grooves 4 having a side length of 144 micrometers, which were not open at the side surfaces and had a U-shaped cross-section with a width of 30 micrometers and a depth of 15 micrometers, at intervals of 500 micrometers (i.e. a density of $4.6 \times 10^2/cm^2$). Then the embossing press panel thus obtained was pressed to release paper at a temperature of 140 degrees C. for 20 seconds, so that the emboss shape was transferred to the release paper to obtain Release Liner 6 which had a male surface structure. Using this release liner, Adhesive Sheet K with a release liner was obtained in the same manner as in Example 7.

EXAMPLE 9

An embossing press panel was prepared by engraving a panel with Grooves 5 which were open at the side surfaces and had a U-shaped cross-section with a width of 20 micrometers and a depth of 10 micrometers, at a pitch of 300 micrometers in such a lattice-like arrangement that the shape of each section partitioned by the above grooves would be tetragonal (see FIG. 3) and then further engraving each tetragonal section with cross-shaped Grooves 4 with a length of 150 micrometers and width of 150 micrometers, which were not open at the side surfaces and had a U-shaped cross-section with a width of 20 micrometers and a depth of 10 micrometers, at intervals of 300 micrometers (i.e. a density of $1.1 \times 10^3/cm^2$). Then the embossing press panel thus obtained was pressed to release paper at a temperature of 140 degrees C. for 20 seconds, so that the emboss shape was transferred to the release paper to obtain Release Liner 7 which had a male surface structure. Using this release liner, Adhesive Sheet L with a release liner was obtained in the same manner as in Example 7.

EXAMPLE 10

An embossing press panel was prepared by engraving a panel with Grooves 5, which were open at the side surfaces and had a U-shaped cross-section with a width of 50 micrometers and a depth of 20 micrometers, at a pitch of 700 micrometers so that the shape of each section partitioned by the above grooves would be circular (see FIG. 6) and then further engraving each circular section with circular Grooves 4 having a diameter of 350 micrometers, which were not open at the side surfaces and had a U-shaped cross-section with a width of 50 micrometers and a depth of 20 micrometers, at intervals of 700 micrometers (i.e. a density of $2.4 \times 10^2/cm^2$). Then the embossing press panel thus obtained was pressed to release paper at a temperature of 140 degrees C. for 20 seconds, so that the emboss shape was transferred to the release paper to obtain Release Liner 8 which had a male surface structure. Using this release liner, Adhesive Sheet M with a release liner was obtained in the same manner as in Example 7.

EXAMPLE 11

Adhesive Sheet N with a release liner was obtained in the same manner as in Example 7 except that a PP resin film was used instead of the PVC resin film in Example 7.

EXAMPLE 12

Adhesive Sheet O with a release liner was obtained in the same manner as in Example 7 except that a PETG resin film was used instead of the PVC resin film in Example 7.

Comparative Example 4

An embossing press panel was prepared by engraving a panel with Grooves 5, which were open at the side surfaces and had a U-shaped cross-section with a width of 20 micrometers and a depth of 10 micrometers, at a pitch of 500 micrometers in such a lattice-like arrangement that the shape of each section partitioned by the above grooves would be tetragonal. Then the embossing press panel thus obtained was pressed to release paper at a temperature of 140 degrees C. for 20 seconds so that the emboss shape was transferred to the release paper to obtain Release Liner 9 which had a male surface structure. Using this release liner, Adhesive Sheet P with a release liner was obtained in the same manner as in Example 7.

Comparative Example 5

An embossing press panel was prepared by engraving a panel with Grooves 5, which were open at the side surfaces and had a U-shaped cross-section with a width of 30 micrometers and a depth of 15 micrometers, at a pitch of 500 micrometers so that the shape of each section partitioned by the above grooves would be hexagonal. Then the embossing press panel thus obtained was pressed to release paper at a temperature of 140 degrees C. for 20 seconds so that the emboss shape was transferred to the release paper to obtain Release Liner 10 which had a male surface structure. Using this release liner, Adhesive Sheet Q with a release liner was obtained in the same manner as in Example 7.

Comparative Example 6

An embossing press panel was prepared by engraving a panel with Grooves 5, which were open at the side surfaces and had a U-shaped cross-section with a width of 20 micrometers and a depth of 10 micrometers, at a pitch of 300 micrometers in such a lattice-like arrangement that the shape of each section partitioned by the above grooves would be tetragonal. Then the embossing press panel thus obtained was pressed to release paper at a temperature of 140 degrees C. for 20 seconds so that the emboss shape was transferred to the release paper to obtain Release Liner 11 which had a male surface structure. Using this release liner, Adhesive Sheet R with a release liner was obtained in the same manner as in Example 7.

Comparative Example 7

An embossing press panel was prepared by engraving a panel with Grooves 5, which were open at the side surfaces and had a U-shaped cross-section with a width of 50 micrometers and a depth of 20 micrometers, at a pitch of 700 micrometers so that the shape of each section partitioned by the above grooves would be circular. Then the embossing press panel thus obtained was pressed to release paper at a temperature of 140 degrees C. for 20 seconds so that the emboss shape was transferred to the release paper to obtain Release Liner 12 which had a male surface structure. Using this release liner, Adhesive Sheet S with a release liner was obtained in the same manner as in Example 7.

Comparative Example 8

Adhesive Sheet T with a release liner was obtained in the same manner as in Comparative Example 4 except that a PP resin film was used instead of the PVC resin film in Comparative Example 4.

Comparative Example 9

Adhesive Sheet U with a release liner was obtained in the same manner as in Comparative Example 4 except that a PETG resin film was used instead of the PVC resin film in Comparative Example 4.

The aforesaid tests (1) to (3) were performed on the adhesive sheets of Example 7 to 12 and Comparative Example 4 to 9. The results are shown in Table 2.

TABLE 2

| | | | Example 7 | Example 8 | Example 9 | Example 10 | Example 11 | Example 12 |
|---|---|---|---|---|---|---|---|---|
| | Adhesive Sheet with release liner | | J | K | L | M | N | O |
| Composition | Film resin | | PVC resin | PVC resin | PVC resin | PVC resin | PP resin | PETG resin |
| | Adhesive Layer | | Acrylic type | Acrylic type | Acrylic type | Acrylic type | Acrylic type | Acrylic type |
| | Release liner | | 5 | 6 | 7 | 8 | 5 | 5 |
| | Groove 4 | Interval in μm | 500 | 500 | 300 | 700 | 500 | 500 |
| | | Density per cm$^2$ | $4.0 \times 10^2$ | $4.6 \times 10^2$ | $1.1 \times 10^3$ | $2.4 \times 10^2$ | $4.0 \times 10^2$ | $4.0 \times 10^2$ |
| | | Width of groove in μm | 20 | 30 | 20 | 50 | 20 | 20 |
| | | Depth of groove in μm | 10 | 15 | 10 | 20 | 10 | 10 |
| | | Shape of groove | Cross | Hexagonal | Cross | Circular | Cross | Cross |
| | Groove 5 | Pitch in μm | 500 | 500 | 300 | 700 | 500 | 500 |
| | | Width of groove in μm | 20 | 30 | 20 | 50 | 20 | 20 |
| | | Depth of groove in μm | 10 | 15 | 10 | 20 | 10 | 10 |
| | | Shape of groove* | Tetragonal | Hexagonal | Tetragonal | Circular | Tetragonal | Tetragonal |
| Performance | Appearance, ambient temp., 1 hr | | + | + | + | + | + | + |
| | Appearance, 80° C., 168 hrs | | + | + | + | + | + | + |
| | Shrinkage rate in % of a resin film, ambient temp., 1 week | | 0 | 0 | 0 | 0 | 0 | 0 |
| | Shrinkage rate in % of release liner, ambient temp., 1 week | | 0 | 0 | 0 | 0 | 0 | 0 |
| | Shrinkage rate in % of a resin film, 80° C., 1 week | | 0.1 | 0.2 | 0.2 | 0.1 | 0.1 | 0.1 |
| | Shrinkage rate in % of release liner, 80° C., 1 week | | 0.1 | 0.2 | 0.1 | 0.1 | 0.1 | 0.1 |
| | Shrinkage rate in % of a resin film, ambient temp. 3 months | | 0.1 | 0 | 0.1 | 0 | 0 | 0.1 |
| | Shrinkage rate in % of release liner, ambient temp. 3 months | | 0 | 0 | 0.1 | 0.1 | 0 | 0 |
| | Difference in shrinkage rates in %, ambient temp., 1 week | | 0 | 0 | 0 | 0 | 0 | 0 |
| | Difference in shrinkage rates in %, 80° C., 1 week | | 0 | 0 | −0.1 | 0 | 0 | 0 |
| | Difference in shrinkage rates in %, ambient temp., 3 months | | −0.1 | 0 | 0 | 0.1 | 0 | −0.1 |

TABLE 2-continued

|  |  | Com. Ex. 4 | Com. Ex. 5 | Com. Ex. 6 | Com. Ex. 7 | Com. Ex. 8 | Com. Ex. 9 |
|---|---|---|---|---|---|---|---|
|  | Adhesive strength (Initial state) in N/25 mm | 17.1 | 16.7 | 16.4 | 16.5 | 17.4 | 18.0 |
|  | Adhesive strength (Normal condition) in N/25 mm | 21.4 | 20.6 | 20.4 | 20.3 | 21.1 | 22.4 |
|  | Adhesive Sheet with release liner | P | Q | R | S | T | U |
| Composition | Film resin | PVC resin | PVC resin | PVC resin | PVC resin | PP resin | PETG resin |
|  | Adhesive Layer | Acrylic type | Acrylic type | Acrylic type | Acrylic type | Acrylic type | Acrylic type |
|  | Release liner | 9 | 10 | 11 | 12 | 9 | 9 |
| Groove 4 | Interval in μm | n.d. | n.d. | n.d. | n.d. | n.d. | n.d. |
|  | Width of groove in μm | n.d. | n.d. | n.d. | n.d. | n.d. | n.d. |
|  | Depth of groove in μm | n.d. | n.d. | n.d. | n.d. | n.d. | n.d. |
|  | Shape of groove | n.d. | n.d. | n.d. | n.d. | n.d. | n.d. |
| Groove 5 | Pitch in μm | 500 | 500 | 300 | 700 | 500 | 500 |
|  | Width of groove in μm | 20 | 30 | 20 | 50 | 20 | 20 |
|  | Depth of groove in μm | 10 | 15 | 10 | 20 | 10 | 10 |
|  | Shape of groove* | Tetragonal | Hexagonal | Tetragonal | Circular | Tetragonal | Tetragonal |
| Performance | Appearance, ambient temp., 1 hr | + | + | + | + | + | + |
|  | Appearance, 80° C., 168 hrs. | -- | -- | - | -- | -- | -- |
|  | Shrinkage rate in % of a resin film, ambient temp., 1 week | 0 | 0 | 0 | 0 | 0 | 0 |
|  | Shrinkage rate in % of release liner, ambient temp., 1 week | 0 | 0 | 0 | 0 | 0 | 0 |
|  | Shrinkage rate in % of a resin film, 80° C., 1 week | 0.6 | 0.5 | 0.5 | 0.5 | 0.3 | 0.4 |
|  | Shrinkage rate in % of release liner, 80° C., 1 week | 0.1 | 0.2 | 0.1 | 0.2 | 0.1 | 0.1 |
|  | Shrinkage rate in % of a resin film, ambient temp. 3 months | 0.4 | 0.4 | 0.3 | 0.5 | 0.2 | 0.3 |
|  | Shrinkage rate in % of release liner, ambient temp. 3 months | 0 | 0 | 0.1 | 0.1 | 0 | 0.1 |
|  | Difference in shrinkage rates in %, ambient temp., 1 week | 0 | 0 | 0 | 0 | 0 | 0 |
|  | Difference in shrinkage rates in %, 80° C., 1 week | −0.5 | −0.3 | −0.4 | −0.3 | −0.2 | −0.3 |
|  | Difference in shrinkage rates in %, ambient temp., 3 months | −0.4 | −0.4 | −0.2 | −0.4 | −0.2 | −0.2 |
|  | Adhesive strength (Initial state) in N/25 mm | 17.2 | 16.4 | 16.5 | 17.2 | 17.2 | 18.4 |
|  | Adhesive strength (Normal condition) in N/25 mm | 21.3 | 20.3 | 20.3 | 20.1 | 21.5 | 22.3 |

*Expressed in the shape of an adhesive layer partitioned by continuing Grooves 5.

As is shown in Table 2, Adhesive Sheets J to O according to the present invention having Grooves 4 and 5 exhibited less differences in shrinkage rate between the resin film and the release liner after storage for a prolonged time with a release liner on and maintained better appearance after adhesion, compared to Adhesive Sheets P to U from Comparative Examples 4 to 9.

EXAMPLE 13

An embossing press panel was prepared by engraving a panel with Grooves 5, which were open at the side surfaces and had a U-shaped cross-section with a width of 25 micrometers and a depth of 20 micrometers, at a pitch of 500 micrometers in such a lattice-like arrangement that the shape of each section partitioned by the above grooves would be tetragonal (see FIG. 3) and then further engraving each tetragonal section with cross-shaped Grooves 4 with a width of 250 micrometers and a length of 250 micrometers, which were not open at the side surfaces and had a U-shaped cross-section with a width of 25 micrometers and a depth of 20 micrometers, at intervals of 500 micrometers (i.e. a density of $4.0 \times 10^2 /cm^2$). Then the embossing press panel thus obtained was pressed to release paper at a temperature of 140 degrees C. for 20 seconds, so that the emboss shape was transferred to the release paper to obtain Release Liner 13 which had a male surface structure.

Then an acrylic adhesive and a curing agent were combined with toluene and ethyl acetate as solvent in a ratio by weight of 1000:6:100:100 and mixed well at room temperature for 2 minutes. The resulting mixture was applied on Release Liner 13 and dried at 100 degrees C. for 2 minutes to obtain an adhesive layer with a thickness of 30 micrometers. Subsequently the adhesive layer was laminated with a PVC resin film with a thickness of 100 micrometers to obtain Adhesive Sheet V with a release liner.

Comparative Example 10

An embossing press panel was prepared by engraving a panel with Grooves 5, which were open at the side surfaces and had a U-shaped cross-section with a width of 20 micrometers and a depth of 20 micrometers, at a pitch of 400 micrometers in such a lattice-like arrangement that the shape of each section partitioned by the above grooves would be tetragonal. Then the embossing press panel thus obtained was pressed to release paper at a temperature of 140 degrees C. for 20 seconds so that the emboss shape was transferred to the release paper to obtain Release Liner 14 which had a male surface structure. Using this release liner, Adhesive Sheet W with a release liner was obtained in the same manner as in Example 13.

The aforesaid tests (1) to (4) were performed on the adhesive sheets prepared in Example 13 and Comparative Example 10. The results are shown in Table 3.

TABLE 3

|  |  |  | Example 13 | Com. Ex. 10 |
|---|---|---|---|---|
| Composition | Adhesive Sheet with release liner | | V | W |
| | Film resin | | PVC resin | PVC resin |
| | Adhesive Layer | | Acrylic type | Acrylic type |
| | Release liner | | 13 | 14 |
| | Groove 4 | Interval in μm | 500 | n.d. |
| | | Density per cm² | $4.0 \times 10^2$ | n.d. |
| | | Width of groove in μm | 25 | n.d. |
| | | Depth of groove in μm | 20 | n.d. |
| | | Shape of groove | Cross | n.d. |
| | Groove 5 | Pitch in μm | 500 | 400 |
| | | Width of groove in μm | 25 | 20 |
| | | Depth of groove in μm | 20 | 20 |
| | | Shape of groove* | Tetragonal | Tetragonal |
| Performance | Appearance, ambient temp. 1 hr | | + | + |
| | Appearance, 80° C., 168 hrs | | + | -- |
| | Shrinkage rate in % of a resin film, ambient temp., 1 week | | 0 | 0 |
| | Shrinkage rate in % of release liner, ambient temp., 1 week | | 0 | 0 |
| | Shrinkage rate in % of a resin film, 80° C., 1 week | | 0.1 | 0.4 |
| | Shrinkage rate in % of release liner, 80° C., 1 week | | 0.1 | 0.2 |
| | Shrinkage rate in % of a resin film, ambient temp. 3 months | | 0 | 0.3 |
| | Shrinkage rate in % of release liner, ambient temp. 3 months | | 0.1 | 0 |
| | Difference in shrinkage rates in %, ambient temp., 1 week | | 0 | 0 |
| | Difference in shrinkage rates in %, 80° C., 1 week | | 0 | -0.2 |
| | Difference in shrinkage rates in %, ambient temp., 3 months | | 0.1 | -0.3 |
| | Contact area ratio in % | | 93 | 94 |
| | Adhesive strength (Initial state) in N/25 mm | | 16.9 | 17.1 |
| | Adhesive strength (Normal condition) in N/25 mm | | 22.2 | 21.0 |

*Expressed in the shape of an adhesive layer partitioned by continuing grooves.

EXAMPLE 14

Figure 10:
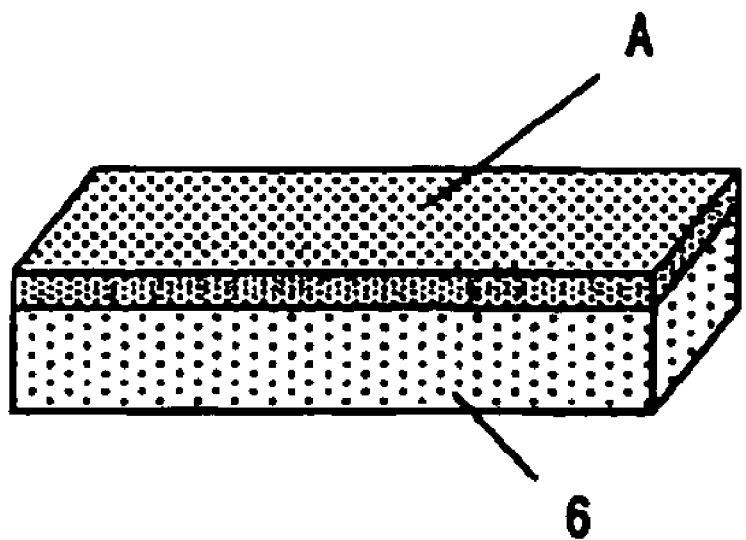
FIG. 10 is a schematic view of an example of the release liners of the present invention.
Figure 11:
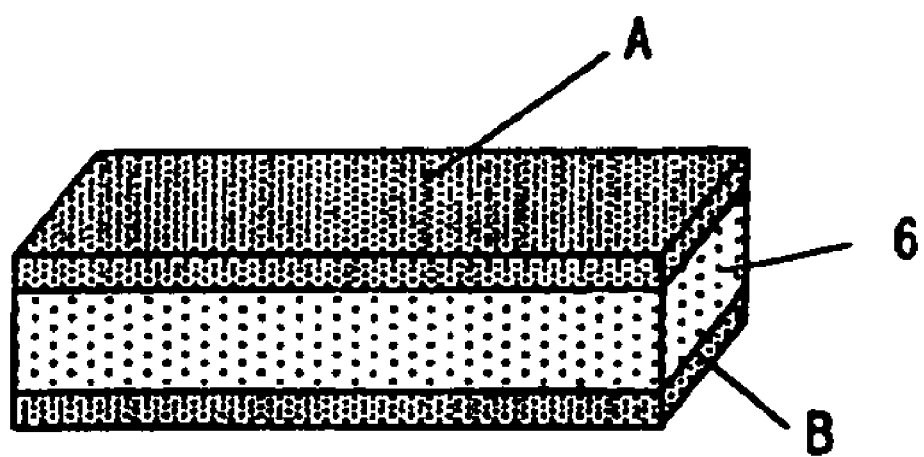
FIG. 11 is a schematic view of another example of the release liners of the present invention.

As shown in FIG. 10, molten LDPE was extruded on one side of a PET film with a thickness of 100 micrometers as a substrate film 6, which were pressed to bond by roll and laminate so that the thickness of LDPE layer was 20 micrometers. To a surface of the LDPE layer (layer A) of this laminated film was transferred the same emboss shape as in the release liner 6 in Example 8 in the same manners in Example 8. Then, the surface of the LDPE layer was treated with silicone to obtain release liner of Example 14.

Subsequently, the procedures of Example 8 were repeated to obtain an adhesive sheet with a release liner except that the release liner prepared as described above was used instead of the release liner 6 of Example 8.

EXAMPLE 15

The procedures of Example 14 were repeated to obtain a release liner and an adhesive sheet with a release liner except that the PET film thickness was 75 micrometers and the LDPE layer thickness was 15 micrometers.

EXAMPLE 16

The procedures of Example 14 were repeated to obtain a release liner and an adhesive sheet with a release liner except that LDPE layers with a thickness of 20 micrometers were laminated to both sides of a PET film with a thickness of 100 micrometers as a substrate film 6 and embossing and silicone treatment were provided on one side of the LDPE layers (layer A).

EXAMPLE 17

The procedures of Example 16 were repeated to obtain a release liner and an adhesive sheet except that a PET film with inner cavities with a thickness of 125 micrometers was used instead of the PET film with a thickness of 100 micrometers used in Example 16.

EXAMPLE 18

The procedures of Example 16 were repeated to obtain a release liner and an adhesive sheet with a release liner except that a film of copolymer of isophthalic acid, terephthalic acid, and ethylene glycol was used instead of a PET film and the emboss shape of Release Liner 2 of Example 2 was transferred instead of that of Release Liner 6 of Example 8.

EXAMPLE 19

The procedures of Example 16 were repeated to obtain a release liner and an adhesive sheet with a release liner except that the thickness of the PET film was 125 micrometers, HDPE layers each with a thickness of 35 micrometers were used instead of the LDPE layers each with a thickness of 20 micrometers, and the emboss shape of Release Liner 7 of Example 9 was transferred instead of the emboss shape of Release Liner 6 of Example 8.

EXAMPLE 20

The procedures of Example 16 were repeated to obtain a release liner and an adhesive sheet with a release liner except that Homo-PP layers, instead of the LDPE layer, were laminated to both sides of the PET film.

EXAMPLE 22

The procedures of Example 16 were repeated to obtain a release liner and an adhesive sheet with a release liner except that a PETG resin film was used as a resin film instead of the PVC resin film.

The aforementioned tests (2) and (5) to (11) were performed on the release liners and the adhesive sheets with a release liner of Examples 14 to 22. The results are shown in Table 4.

TABLE 4

| | | | | Example 14 | Example 15 | Example 16 | Example 17 | Example 18 | Example 19 | Example 20 | Example 21 | Example 22 |
|---|---|---|---|---|---|---|---|---|---|---|---|---|
| Composition | Release liner | Substrate film | Kind | PET | PET | PET | PET with cavities | PET with phthalic acid isomers | PET | PET | PET | PET |
| | | | Thickness in μm | 100 | 75 | 100 | 125 | 100 | 125 | 100 | 100 | 100 |
| | | | Loop stiffness flexural strength in mN/25 mm | 573 | 269 | 573 | 756 | 359 | 1091 | 573 | 573 | 573 |
| | | | Yield point load ambient temp., in N/10 mm | 91 | 52 | 91 | 93 | 42 | 142 | 91 | 91 | 91 |
| | | Polyolefin resin layer (A) with emboss and silcone treatments | Kind | LDPE | LDPE | LDPE | LDPE | LDPE | HDPE | Homo-PP | LDPE | LDPE |
| | | | Thickness in μm | 20 | 15 | 20 | 20 | 20 | 35 | 20 | 20 | 20 |
| | | | Vicat softening point in deg. C. | 100 | 100 | 100 | 100 | 100 | 125 | 150 | 100 | 100 |
| | | | Emboss shape by # of Example | Example 8 | Example 8 | Example 8 | Example 8 | Example 2 | Example 9 | Example 8 | Example 8 | Example 8 |
| | | Polyolefin resin layer (B) | Kind | | | LDPE | LDPE | LDPE | HDPE | Homo-PP | HDPE | LDPE |
| | | | Thickness in μm | | | 20 | 20 | 20 | 35 | 20 | 35 | 20 |
| | | | Vicat softening point in deg. C. | | | 100 | 100 | 100 | 125 | 150 | 125 | 100 |
| | | Resin film | | PVC resin | PVC resin | PVC resin | PVC resin | PVC resin | PVC resin | PVC resin | PP resin | PETG resin |
| | | Adhesive layer | | Acrylic type | Acrylic type | Acrylic type | Acrylic type | Acrylic type | Acrylic type | Acrylic type | Acrylic type | Acrylic type |
| Performance | | Suitability for emboss treatment | | + | + | + | + | + | + | + | + | + |
| | | Shrinkage rate in % of release liner during embossing | | 0.3 | 0.5 | 0.3 | 0.4 | 0.5 | 0.3 | 0.3 | 0.3 | 0.3 |
| | | Curling of release liner after embossing | | + | + | ++ | + | + | ++ | + | ++ | ++ |
| | | Curling of release liner, 80 deg. C., after 1 week | | + | + | ++ | + | + | ++ | + | ++ | ++ |
| | | Shrinkage rate in % of release liner ambient temp., after 1 week | | 0 | 0 | 0 | 0 | 0 | 0 | 0 | 0 | 0 |
| | | Shrinkage rate in % of release liner 80 deg. C. after 1 week | | 0.1 | 0.2 | 0.1 | 0.1 | 0.2 | 0 | 0.1 | 0.1 | 0.1 |
| | | Shrinkage rate in % of release liner ambient temp., after 3 months | | 0 | 0.1 | 0 | 0.1 | 0.1 | 0.1 | 0.1 | 0.1 | 0 |
| | | Resistance of release liner to hot solvent | | + | + | + | + | + | + | + | + | + |
| | | Applicability of adhesive sheet | | + | + | + | + | + | + | + | + | + |
| | | Surface smoothness of adhesive sheet | | + | + | + | + | + | + | + | + | + |
| | | Appearance of adhesive sheet ambient temp., after 1 h. | | + | + | + | + | + | + | + | + | + |
| | | Appearance of adhesive sheet 80 deg., after 168 hrs | | + | + | + | + | + | + | + | + | + |

"PET with phthalic acid isomers" means a copolymer of phthalic acid isomers and ethylene glycol

EXAMPLE 21

The procedures of Example 16 were repeated to obtain a release liner and an adhesive sheet with a release liner except that HDPE layers each with a thickness of 35 micrometers were used as layer (B) instead of the LDPE layer, and a PP resin film was used as a resin film instead of the PVC resin film.

Comparative Examples 11 to 23 (Comparative Examples for the Release Liners According to Claims 9 and 13)

The procedures of Example 14 or 16 were repeated to obtain release liners and adhesive sheets with the release liner having compositions shown in Table 5. The release liners of Comparative Example 11 to 14 were composed of a substrate film alone and one side of the substrate film was subjected to emboss treatment and silicone treatment. The resulting release liners and the adhesive sheets with the release liner were subjected to the aforementioned tests (2) and (5) to (11).

The results are shown in Table 5.

TABLE 5

|  |  |  |  | Com. Ex. 11 | Com. Ex. 12 | Com. Ex. 13 | Com. Ex. 14 | Com. Ex. 15 | Com. Ex. 16 |
|---|---|---|---|---|---|---|---|---|---|
| Composition | Release liner | Substrate film | Kind | PET | PET with phthalic acid isomoers | OPP | Acrylic resin | PET | PET |
|  |  |  | Thickness in μm | 100 | 100 | 80 | 125 | 35 | 200 |
|  |  |  | Loop stiffness flexural strength in mN/25 mm | 573 | 359 | 144 | 913 | 10.4 | 1152 |
|  |  |  | Yield point load in N/10 mm ambient temp., | 91 | 42 | 23 | 132 | 13 | 135 |
|  |  | Polyolefin resin layer (A) with emboss and silcone treatment | Kind |  |  |  |  | LDPE | LDPE |
|  |  |  | Thickness in μm |  |  |  |  | 10 | 30 |
|  |  |  | Vicat softening point in deg. C. |  |  |  |  | 100 | 100 |
|  |  |  | Emboss shape by # of Example | Example 8 | Example 8 | Example 8 | Example 8 | Example 8 | Example 8 |
|  |  | Polyolefin resin layer (B) | Kind |  |  |  |  |  | LDPE |
|  |  |  | Thickness in μm |  |  |  |  |  | 30 |
|  |  |  | Vicat softening point in deg. C. |  |  |  |  |  | 100 |
|  |  | Resin film |  | PVC resin | PVC resin | PVC resin | PVC resin | PVC resin | PVC resin |
|  |  | Adhesive layer |  | Acrylic type | Acrylic type | Acrylic type | Acrylic type | Acrylic type | Acrylic type |
| Performance |  | Suitability for emboss treatment |  | -- | -- | -- | - | + | + |
|  |  | Shrinkage rate in % of release liner during embossing |  | 0.3 | 0.5 | >50 | 2.5 | 0.6 | 0.5 |
|  |  | Curling of release liner after embossing |  | ++ | ++ | n.d. | + | -- | + |
|  |  | Curling of release liner 80 deg. C. 1 week |  | ++ | ++ | n.d. | + | -- | + |
|  |  | Shrinkage rate in % of release liner ambient temp., 1 week |  | 0 | 0 | n.d. | 0 | 0 | 0 |
|  |  | Shrinkage rate in % of release liner 80 deg. C., 1 week |  | 0.1 | 0.2 | n.d. | 0.2 | 0.1 | 0.2 |
|  |  | Shrinkage rate in % of release liner ambient temp., 3 months |  | 0 | 0.1 | n.d. | 0.1 | 0 | 0.1 |
|  |  | Resistance of release liner to hot solvent |  | + | + | n.d. | -- | + | + |
|  |  | Applicability of adhesive sheet |  | + | + | n.d. | n.d. | + | -- |
|  |  | Surface smoothness of adhesive sheet |  | + | + | n.d. | n.d. | - | + |
|  |  | Apperance of adhesive sheet ambient temp., 1 h. |  | + | + | n.d. | n.d. | + | + |
|  |  | Apperance of adhesive sheet 80 deg., 168 hrs |  | + | + | n.d. | n.d. | + | + |

|  |  |  |  | Com. Ex. 17 | Com. Ex. 18 | Com. Ex. 19 | Com. Ex. 20 | Com. Ex. 21 | Com. Ex. 22 | Com. Ex. 23 |
|---|---|---|---|---|---|---|---|---|---|---|
| Composition | Release liner | Substrate film | Kind | PET | PET | PET | PET | High quality paper | High quality paper | PET |
|  |  |  | Thickness in μm | 100 | 100 | 100 | 100 | 120 | 120 | 100 |
|  |  |  | Loop stiffness flexural strength in mN/25 mm | 756 | 573 | 573 | 573 | 547 | 547 | 573 |
|  |  |  | Yield point load in N/10 mm ambient temp., | 93 | 91 | 91 | 91 | break | break | 91 |
|  |  | Polyolefin resin layer (A) with emboss and silcone treatment | Kind | LDPE | LDPE | LDPE | soft PVC | LDPE | LDPE | Ionomer |
|  |  |  | Thickness in μm | 50 | 65 | 45 | 20 | 20 | 20 | 20 |
|  |  |  | Vicat softening point in deg. C. | 100 | 100 | 100 | 70 | 100 | 100 | 75 |
|  |  |  | Emboss shape by # of Example | Example 8 | Example 8 | Example 8 | Example 8 | Example 8 | Example 8 | Example 8 |
|  |  | Polyolefin resin layer (B) | Kind |  | LDPE | LDPE |  |  | LDPE |  |
|  |  |  | Thickness in μm |  | 55 | 10 |  |  | 20 |  |
|  |  |  | Vicat softening point in deg. C. |  | 100 | 100 |  |  | 100 |  |
|  |  | Resin film |  | PVC resin | PVC resin | PVC resin | PVC resin | PVC resin | PVC resin | PVC resin |
|  |  | Adhesive layer |  | Acrylic type | Acrylic type | Acrylic type | Acrylic type | Acrylic type | Acrylic type | Acrylic type |
| Performance |  | Suitability for emboss treatment |  | + | + | + | + | + | + | + |
|  |  | Shrinkage rate in % of release liner during embossing |  | 0.4 | 0.4 | 0.4 | 0.3 | 0.3 | 0.3 | 0.3 |
|  |  | Curling of release liner after embossing |  | -- | -- | -- | -- | - | ++ | -- |
|  |  | Curling of release liner 80 deg. C. 1 week |  | -- | -- | -- | -- | - | ++ | -- |

TABLE 5-continued

| | | | | | | | |
|---|---|---|---|---|---|---|---|
| Shrinkage rate in % of release liner ambient temp., 1 week | 0 | 0 | 0 | 0 | 0 | 0 | 0 |
| Shrinkage rate in % of release liner 80 deg. C., 1 week | 0.1 | 0.1 | 0.1 | 0.1 | 0.1 | 0.1 | 0.1 |
| Shrinkage rate in % of release liner ambient temp., 3 months | 0.1 | 0.1 | 0.1 | 0.2 | 0.1 | 0.1 | 0.1 |
| Resistance of release liner to hot solvent | + | + | + | -- | + | + | -- |
| Applicability of adhesive sheet | + | + | + | n.d. | + | + | n.d. |
| Surface smoothness of adhesive sheet | − | − | − | n.d. | − | − | n.d. |
| Apperance of adhesive sheet ambient temp., 1 h. | + | + | + | n.d. | + | + | n.d. |
| Apperance of adhesive sheet 80 deg., 168 hrs | + | + | + | n.d. | + | + | n.d. |

"PET with phthalic acid isomers" means a copolymer of phthalic acid isomers and ethylene glycol
"N.d." means that the value was unable to be determined.

As seen from Table 4, the release liner of the present invention was good in suitability for emboss treatment and no curling occurred after the release liner was subjected to emboss treatment. When the adhesive sheet with the release liner of the present invention was let to adhere to an article, excellent smoothness of the surface and excellent appearance were obtained.

Meanwhile, as seen from Table 5, the release liners of Comparative Examples 11 to 14 composed of a substrate film alone without polyolefin resin-containing layer were poor in suitability for emboss treatment. Particularly, the release liner of Comparative Example 13 whose substrate film was of an OPP resin caused such a significant shrinkage during the embossing that the evaluation test could not be conducted. The release liner of Comparative Example 14 whose substrate film was of an acrylic resin was poor in resistance to hot solvents and, therefore, an adhesive sheet with release liner could not be prepared. Accordingly the evaluation could not be performed. The release liners of Comparative Examples 15 and 17 to 19, whose layer thickness is out of the range of the present invention, caused curling. The layer thickness of the release liner of Comparative Example 16 was out of the range of the present invention and accordingly the applicability of the adhesive sheet was poor. The release liners of Comparative Examples 20 and 23 whose polyolefin resin was a soft PVC or an ionomer, respectively, caused curling and were poor in resistance to hot solvents. Adhesive sheets with these release liners could not be prepared and, therefore, the evaluation tests for adhesive sheet could not be conducted. In Comparative Examples 21 and 22, where high quality paper was used as a substrate film, the adhesive sheets were poor in surface smoothness

INDUSTRIAL APPLICABILITY

The adhesive sheet according to the present invention is an adhesive sheet comprising an adhesive layer on one side of a resin film, wherein a good appearance is maintained after stored with a release liner thereon for a prolonged time, and a good appearance and a good adhesion are maintained when it is applied to an article. The shrinkage is prevented by using a release liner having surface structure complementary to that of the adhesive layer.

The release liner of the present invention has embosses on its surface and is useful as a release liner for an adhesive sheet having grooves on the surface of the adhesive layer. The release liner of the present invention is also good in smoothness and, therefore, particularly useful as a release liner for a high gloss adhesive sheet whose side opposite to the adhesive layer is mirror-like.

The invention claimed is:

1. An adhesive sheet comprising a resin film and an adhesive layer adhering to one side of the resin film, wherein the adhesive layer has one or more grooves on a first side that is opposite to a second side of the adhesive that adheres to the resin film, and the groove or grooves exist only in an inner area of the first side of the adhesive layer and are not open at edges of the adhesive layer.

2. The adhesive sheet according to claim 1, wherein the adhesive layer further has grooves that are open at the edges of the adhesive on the first side.

3. The adhesive layer according to claim 2, wherein two or more grooves that are open at the edges are arranged in a stripe pattern or arranged so that each section of the adhesive layer that is partitioned by the two or more grooves is circular, oval or polygonal.

4. The adhesive sheet according to claim 3, wherein the grooves that are not open at the edges are in the form of a polygon that is a tetragonal or hexagonal shape.

5. The adhesive sheet according to claim 2, wherein the grooves that are not open at the edges have a width of from 5 to 100 micrometers and a depth of from 5 to 50 micrometers.

6. The adhesive sheet according to claim 2, wherein the grooves that are not open at the edges are in a form of a straight line, branched straight lines, cross, circle, oval, or polygon in a front view of the first side of the adhesive layer, wherein each form may be comprised of plural discontinuous grooves.

7. The adhesive sheet according to claim 6, wherein the grooves that are not open at the edges are in the form of the polygon that is a tetragonal or hexagonal shape.

8. The adhesive sheet according to claim 2, wherein the grooves that are not open at the side surfaces exist in a density of from $1 \times 10$ to $3.7 \times 10^6/cm^2$ in the front view of the first side of the adhesive layer.

9. A release liner having embosses that are complementary to a surface structure of the adhesive layer of the adhesive sheet according to claim 2.

10. A release liner according to claim 9, further comprising a substrate film with a thickness of from 50 to 150 micrometers and a polyolefin resin-containing layer on one or both sides of the substrate film, wherein the polyolefin resin is not ethylene-methacrylic acid copolymers or ionomers thereof, wherein at least one of the polyolefin resin-containing layers has embosses on a first side that is opposite to a second side of the polyolefin resin-containing layer that is in contact with the substrate film; wherein the substrate film comprises one or more materials selected from the group consisting of polyethylene terephthalate, polyethylene terephthalate with inner cavities, copolymer of phthalic acid isomers and ethylene glycol, polyethylene naphthalate, polybutylene terephthalate, and polytrimethylene terephthalate; and a thickness of the polyolefin resin-containing layer is 10 micrometers or more and is at most 0.3 a thickness of the substrate film when the polyolefin resin-containing layer exists only on one side of the substrate film, or wherein the thickness of the polyolefin resin-containing layer is 10 micrometers or more and is at most 0.5 times the thickness of the substrate film, with a ratio of the thicknesses of the polyolefin resin-containing being from 0.3 to 1, when the polyolefin resin-containing layers exist on both sides of the substrate film.

11. The release liner according to claim 10, wherein the polyolefin resin is a polyethylene resin or a polypropylene resin.

12. An adhesive sheet with a release liner, comprising:
the adhesive sheet according to claim 2, and
a release liner having embosses that are complementary to a surface structure of the adhesive layer of the adhesive sheet.

13. The adhesive sheet according to claim 1, wherein the grooves that are not open at the edges have a width of from 5 to 100 micrometers and a depth of from 5 to 50 micrometers.

14. The adhesive sheet according to claim 1, wherein the grooves that are not open at the edges are in a form of a straight line, branched straight lines, cross, circle, oval, or polygon in a front view of the first side of the adhesive layer, wherein each form may be comprised of plural discontinuous grooves.

15. The adhesive sheet according to claim 14, wherein the grooves that are not open at the edges are in the form of the polygon that is a tetragonal or hexagonal shape.

16. The adhesive sheet according to claim 1, wherein the grooves that are not open at the edges exist in a density of from $1 \times 10$ to $3.7 \times 10^6/cm^2$ in the front view of the first side of the adhesive layer.

17. A release liner having embosses that are complementary to a surface structure of the adhesive layer of the adhesive sheet according to claim 1.

18. A release liner according to claim 17 further comprising a substrate film with thickness of from 50 to 150 micrometers and a polyolefin resin-containing layer on one or both sides of the substrate film, wherein the polyolefin resin is not ethylene-methacrylic acid copolymers or ionomers thereof, wherein at least one of the polyolefin resin-containing layers has embosses on a first side that is opposite to a second side thereof that is in contact with the substrate film; the substrate film comprises one or more materials selected from the group consisting of polyethylene terephthalate, polyethylene terephthalate with inner cavities, copolymer of phthalic acid isomers and ethylene glycol, polyethylene naphthalate, polybutylene terephthalate, and polytrimethylene terephthalate; wherein the thickness of the polyolefin resin-containing layer is 10 micrometers or more and is at most 0.3 times a of the substrate film when the polyolefin resin-containing layer exists only on one side of the substrate film, wherein the thickness of the polyolefin resin-containing layer is 10 micrometers or more in thickness and is at most 0.5 times the thickness of the substrate film, with a ratio of the thicknesses of the two polyolefin resin-containing being from 0.3 to 1, when the polyolefin resin-containing layers exist on both sides of the substrate film.

19. The release liner according to claim 18, wherein the substrate film has been bi-axially drawn.

20. The release liner according to claim 18, wherein the polyolefin resin is a polyethylene resin or a polypropylene resin.

21. An adhesive sheet with a release liner, comprising:
the adhesive sheet according to claim 1, and
a release liner having embosses that are complementary to a surface structure of the adhesive layer of the adhesive sheet.

* * * * *